United States Patent
Jeong et al.

(10) Patent No.: US 9,681,127 B2
(45) Date of Patent: Jun. 13, 2017

(54) VIDEO ENCODING METHOD AND DEVICE AND VIDEO DECODING METHOD AND DEVICE FOR PARALLEL PROCESSING

(71) Applicant: SAMSUNG ELECTRONICS CO., LTD., Suwon-si (KR)

(72) Inventors: Seung-soo Jeong, Seoul (KR); Tammy Lee, Seoul (KR); Jae-hyun Kim, Seoul (KR); Chan-yul Kim, Bucheon-si (KR); Jeong-hoon Park, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 328 days.

(21) Appl. No.: 14/514,892

(22) Filed: Oct. 15, 2014

(65) Prior Publication Data

US 2015/0030086 A1 Jan. 29, 2015

Related U.S. Application Data

(63) Continuation of application No. PCT/KR2013/003153, filed on Apr. 15, 2013.
(Continued)

(51) Int. Cl.
H04N 19/42 (2014.01)
H04N 19/436 (2014.01)
(Continued)

(52) U.S. Cl.
CPC ..... *H04N 19/00521* (2013.01); *H04N 19/174* (2014.11); *H04N 19/436* (2014.11); *H04N 19/44* (2014.11); *H04N 19/70* (2014.11)

(58) Field of Classification Search
None
See application file for complete search history.

(56) References Cited

U.S. PATENT DOCUMENTS

2011/0085601 A1 4/2011 Lee et al.
2011/0145549 A1 6/2011 Suk et al.
(Continued)

FOREIGN PATENT DOCUMENTS

CN 104205848 A 12/2014
KR 10-2007-0110636 A 11/2007
(Continued)

OTHER PUBLICATIONS

Jeong S S et al., "Syntax on parallel processing information signaling", 8. JCT-VC Meeting; 99. MPEG Meeting; Jan. 2, 2012-Oct. 2, 2012; San Jose; (Joint Collaborative Team on Video Coding of ISO/IEC JTC1/SC29/WG11 and ITU-T SG.16 ); URL: http://wftp3.itu.int/av-arch/jctvc-site/ , No. JCTVC-H0293, Jan. 20, 2012 (Jan. 20, 2012), XP030111320, total 4 pages.
(Continued)

*Primary Examiner* — Sath V Perungavoor
*Assistant Examiner* — Janese Duley
(74) *Attorney, Agent, or Firm* — Sughrue Mion, PLLC

(57) ABSTRACT

Provided are video encoding and decoding methods and apparatuses for parallel processing. The video decoding method includes obtaining a parallel processing syntax indicating a parallel processing type that is applied to a second data unit of a lower level from a first data unit header of an upper level, obtaining a parallel processing flag indicating whether the parallel processing type is applied to the second data unit from a second data unit header, and determining whether the parallel processing type is applied to the second data unit based on the obtained parallel processing flag.

3 Claims, 19 Drawing Sheets

Related U.S. Application Data

(60) Provisional application No. 61/624,356, filed on Apr. 15, 2012.

(51) Int. Cl.
*H04N 19/70* (2014.01)
*H04N 19/44* (2014.01)
*H04N 19/174* (2014.01)

(56) References Cited

U.S. PATENT DOCUMENTS

| | | | |
|---|---|---|---|
| 2011/0243219 A1 | 10/2011 | Hong et al. | |
| 2012/0059616 A1 | 3/2012 | Zhao | |
| 2012/0093217 A1 | 4/2012 | Jeon et al. | |
| 2013/0101034 A1* | 4/2013 | Wahadaniah | H04N 19/70 375/240.12 |
| 2013/0114735 A1* | 5/2013 | Wang | H04N 19/176 375/240.23 |
| 2014/0056360 A1 | 2/2014 | Han et al. | |
| 2014/0328411 A1 | 11/2014 | Jeong et al. | |
| 2014/0341478 A1* | 11/2014 | Sasai | H04N 19/463 382/233 |

FOREIGN PATENT DOCUMENTS

| | | |
|---|---|---|
| KR | 10-0813435 B1 | 3/2008 |
| KR | 10-2010-0109459 A | 10/2010 |
| KR | 10-2011-0038349 A | 4/2011 |
| KR | 10-2011-0044486 A | 4/2011 |
| KR | 10-2011-0066523 A | 6/2011 |
| KR | 10-2011-0067674 A | 6/2011 |
| WO | 2011/126285 A2 | 10/2011 |

OTHER PUBLICATIONS

Jeong S et al., "Syntax on wavefront information", 100. MPEG Meeting; Apr. 30, 2012-Apr. 5, 2012; Geneva; (Motion Picture Expert Group or ISO/IEC JTC1/SC29/VVG11), No. m24378, Jun. 7, 2012 (Jun. 7, 2012), XP030052723, total 5 pages.

Jeong S et al., "Syntax on entropy slice information", 9. JCT-VC Meeting; 100. MPEG Meeting; Apr. 27, 2012-May 7, 2012; Geneva; (Joint Collaborative Team on Video Coding of ISO/IEC JTC1/SC29/WG11 and ITU-T SG.16 ); URL: http://wftp3.itu.int/av-arch/jctvc-site/ , No. JCTVC-I0138, Apr. 16, 2012 (Apr. 16, 2012), XP030111901, total 3 pages.

Sjaberg R et al., "ANG4: Enabling decoder parallelism with tiles", 9. JCT-VC Meeting; 100. MPEG Meeting; Apr. 27, 2012-Jul. 5, 2012; Geneva; (Joint Collaborative Team on Video Coding of ISO/IEC JTC1/SC29/WG11 and ITU-T SG.16 ); URL: http://wftp3.itu.int/av-arch/jctvc-site/ , No. JCTVC-I0233, Apr. 17, 2012 (Apr. 17, 2012), XP030111996, total 14 pages.

Communication from the European Patent Office issued Oct. 8, 2015 in a counterpart European Application No. 13778960.8.

Written Opinion dated Jul. 22, 2013 issued by the International Searching Authority in counterpart International Patent Application No. PCT/KR2013/003153 (PCT/ISA/237).

Search Report dated Jul. 22, 2013 issued by the International Searching Authority in counterpart International Patent Application No. PCT/KR2013/003153 (PCT/ISA/210).

Communication dated Aug. 21, 2014 issued by the Korean Intellectual Property Office in counterpart Korean Patent Application No. 10-2013-0041275.

Communication dated Mar. 19, 2014 issued by the Korean Intellectual Property Office in counterpart Korean Patent Application No. 10-2013-0041275.

Communication dated Aug. 4, 2014 issued by the Korean Intellectual Property Office in counterpart Korean Patent Application No. 10-2014-0075054.

Seung-Min Jang et al.; "A Mixing of H.264/AVC Video Streams Based on Slice in the Compressed Domain"; vol. 34; No. 10; 2009-2010; 9 pages total.

Communication dated Mar. 2, 2017, issued by the State Intellectual Property Office of P.R. China in counterpart Chinese Application No. 201380031639.X.

* cited by examiner

CODING UNIT (1010)

PREDICTION UNIT (1060)

FIG. 22

```
seq_parameter_set_rbsp( ) {
    ...
2210 ─── parallel_processing_type_idc
    ...
}
```

FIG. 23

| parallel_processing_idc | PARALLEL PROCESSING TYPE |
|---|---|
| 0 | No parallel processing |
| 1 | Tile |
| 2 | WPP |
| 3 | slice |
| ... | ... |

FIG. 24

```
pic_parameter_set_rbsp( ) {
    ...
    if(parallel_processing_ type_idc ==1){
2410 ───  tiles_enabled_flag
    }
    ...
}
```

FIG. 25

```
pic_parameter_set_rbsp( ) {
    ...
    if(parallel_processing_ type_idc ==2){
2510 ── wpp_enabled_flag
    }
    ...
}
```

FIG. 26

```
slice_header( ) {
    ...
    if(parallel_processing_ type_idc ==3){
2650 ── independent_slice_flag (or dependent_slice_flag)
    }
    ...
}
```

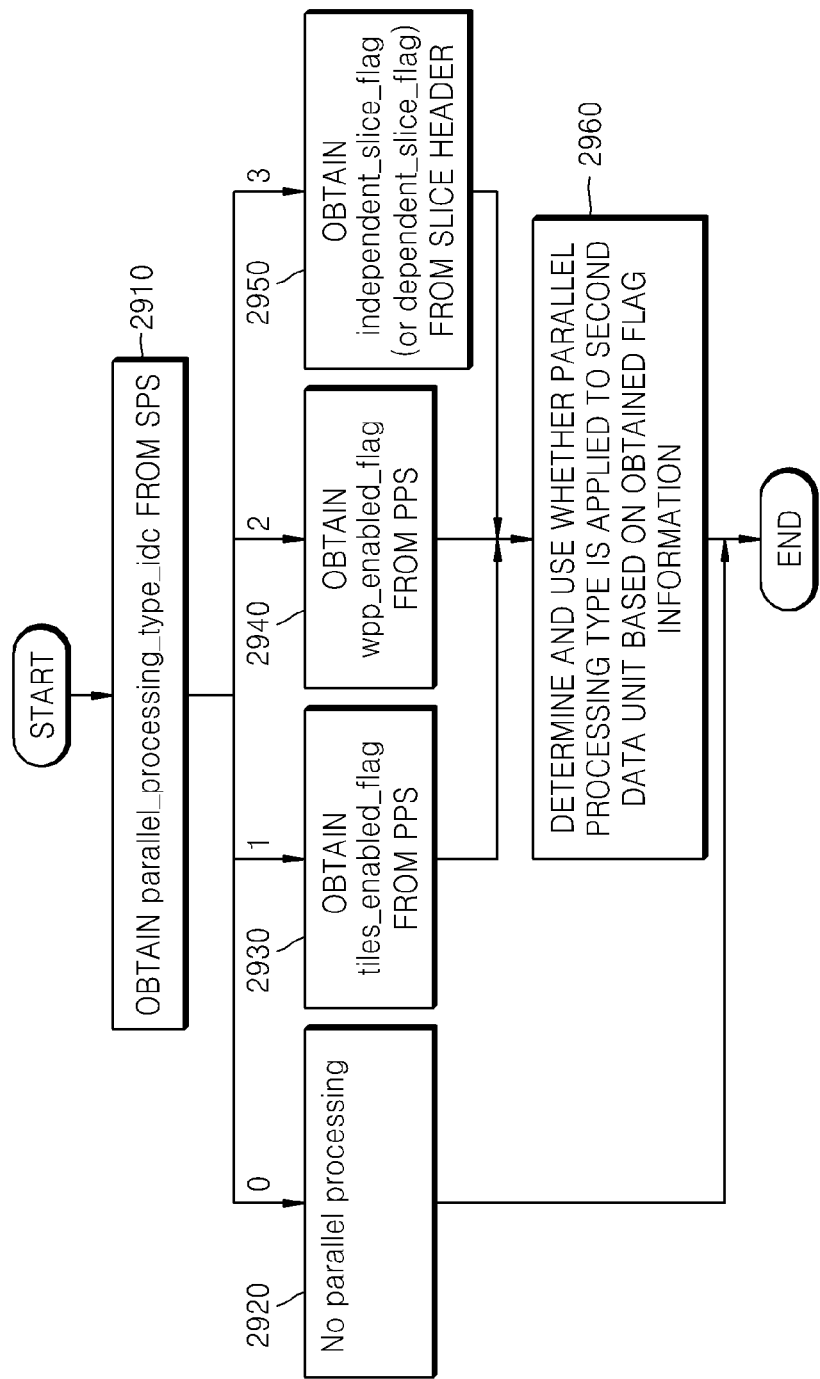

VIDEO ENCODING METHOD AND DEVICE AND VIDEO DECODING METHOD AND DEVICE FOR PARALLEL PROCESSING

CROSS-REFERENCE TO RELATED APPLICATIONS

This is a bypass continuation of PCT/KR2013/003153, filed on Apr. 15, 2013, which claims the benefit of U.S. Provisional Application 61/624,356, filed on Apr. 15, 2012, in the United States Patent and Trademark Office, the disclosures of which are hereby incorporated herein in their entirety by reference.

BACKGROUND

1. Field

Exemplary embodiments relate to video encoding and decoding for parallel processing.

2. Related Art

As digital display technology has developed and high quality digital television (TV) has arrived, a new codec for processing large amounts of video data has been suggested. As hardware performance has improved, a central processing unit (CPU) or a graphics processing unit (GPU) for processing a video image is configured to include multiple cores and thus may simultaneously process image data.

SUMMARY

Exemplary embodiments provide a video encoding method and apparatus that expresses whether to use a plurality of parallel processing types for parallel processing of video data by using a unified syntax, and a video decoding method and apparatus of the video encoding method and apparatus.

Exemplary embodiments add a parallel processing type, which may be applied to a data unit having a lower level, to a data unit having an upper level and transmit the data unit having the upper level to which the parallel processing type is added.

According to an aspect of an exemplary embodiment, a video decoding method includes: obtaining, from a first data unit header including encoding information of a first data unit having an upper level that constitutes a video and is included in a bitstream, a parallel processing syntax indicating a parallel processing type that is applied to a second data unit having a lower level included in the first data unit from among a plurality of usable parallel processing types; obtaining, from a second data unit header including encoding information of the second data unit based on the obtained parallel processing syntax, a parallel processing flag indicating whether the parallel processing type indicated by the parallel processing syntax from among the plurality of parallel processing types is applied to the second data unit; and determining whether the parallel processing type indicated by the parallel processing syntax is applied to the second data unit based on the obtained parallel processing flag.

According to an aspect of another exemplary embodiment, a video decoding apparatus includes: a parser that obtains, from a first data unit header including encoding information of a first data unit having an upper level that constitutes a video and is included in a bitstream, a parallel processing syntax indicating a parallel processing type that is applied to a second data unit having a lower level that is included in the first data unit from among a plurality of usable parallel processing types, and obtains, from a second data unit header including encoding information of the second data unit based on the obtained parallel processing syntax, a parallel processing flag indicating whether the parallel processing type indicated by the parallel processing syntax from among the plurality of parallel processing types is applied to the second data unit; and a parallel processing determiner that determines whether the parallel processing type indicated by the parallel processing syntax is applied to the second data unit based on the obtained parallel processing flag.

According to an aspect of another exemplary embodiment, a video encoding method includes: obtaining encoded data of a first data unit that constitutes a video and a second data unit having a level lower than a level of the first data unit; encoding parallel processing syntax information indicating a parallel processing type that is applied to the second data unit from among a plurality of parallel processing types in a first data unit header including encoding information of the first data unit; and encoding a parallel processing flag indicating whether the parallel processing type indicated by the parallel processing syntax is applied to the second data unit in a second data unit header including encoding information of the second data unit.

According to an aspect of another exemplary embodiment, a video encoding apparatus includes: a parallel processing determiner that obtains encoded data of a first data unit that constitutes a video and a second data unit having a level lower than a level of the first data unit, and determines a parallel processing type that is applied to the second data unit from among a plurality of parallel processing types; and a parallel processing information output unit that encodes parallel processing syntax information indicating the parallel processing type that is applied to the second data unit in a first data unit header including encoding information of the first data unit, and encodes a parallel processing flag indicating whether the parallel processing type indicated by the parallel processing syntax is applied to the second data unit in a second data unit header including encoding information of the second data unit.

According to an aspect of another exemplary embodiment, a video decoding method includes: obtaining, from a header of a first data unit of an upper level, a parallel processing syntax indicating a parallel processing type applied to a second data unit of a lower level; obtaining, from a header of a second data unit, a parallel processing flag indicating whether the parallel processing type is applied to the second data unit; and determining whether the parallel processing type is applied to the second data unit based on the obtained parallel processing flag.

The plurality of parallel processing types may include a tile type, a wavefront parallel processing (WPP) type, and a slice type.

The obtaining the parallel processing flag may include skipping a parsing process in response to the parallel processing flag indicating a parallel processing type other than the parallel processing type of the obtained parallel processing syntax.

According to an exemplary embodiment, a plurality of parallel processing types may be indicated by using one index. Since an index indicating a parallel processing type that is applied to a lower data layer is included in an upper data layer, the parallel processing type that may be used while the lower data layer is decoded may be previously determined and an operation of parsing a flag indicating whether to use other parallel processing types may be skipped, thereby increasing a speed at which the lower data layer is processed.

BRIEF DESCRIPTION OF THE DRAWINGS

FIG. 22 is a diagram illustrating a sequence parameter set (SPS) according to an exemplary embodiment.

FIG. 23 is a table showing a parallel processing syntax according to a parallel processing type, according to an exemplary embodiment.

FIG. 24 is a diagram illustrating a picture parameter set (PPS) according to an exemplary embodiment.

FIG. 25 is a diagram illustrating a PPS according to another exemplary embodiment.

FIG. 26 is a diagram illustrating a slice header according to an exemplary embodiment.

FIG. 29 is a detailed flowchart illustrating a video decoding method according to an exemplary embodiment.

DETAILED DESCRIPTION OF THE EXEMPLARY EMBODIMENTS

Exemplary embodiments will now be described more fully with reference to the accompanying drawings, in which the exemplary embodiments are shown.

Video encoding and video decoding based on hierarchical data units according to an exemplary embodiment will be explained with reference to FIGS. 1 through 13. A video encoding method and apparatus and a video decoding method and apparatus that express a parallel processing type by using a unified syntax according to an exemplary embodiment will be explained with reference to FIGS. 14 through 27.

Figure 1:
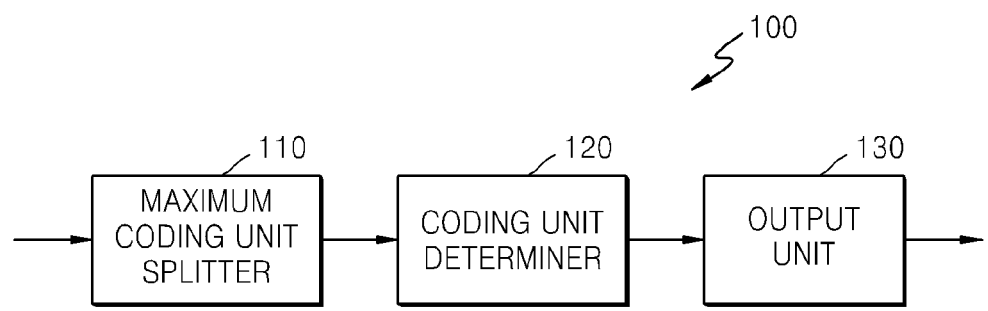
FIG. 1 is a block diagram of a video encoding apparatus according to an exemplary embodiment.

FIG. 1 is a block diagram of a video encoding apparatus 100 according to an exemplary embodiment.

The video encoding apparatus 100 according to an embodiment includes a maximum coding unit splitter 110, a coding unit determiner 120, and an output unit 130 (e.g., an output device, output, etc.).

The maximum coding unit splitter 110 may split a current picture based on a maximum coding unit that is a coding unit having a maximum size for the current picture of an image. If the current picture is larger than the maximum coding unit, image data of the current picture may be split into the at least one maximum coding unit. The maximum coding unit according to an embodiment may be a data unit having a size of 32×32, 64×64, 128×128, or 256×256, wherein a shape of the data unit is a square having a width and length in squares of 2. The image data may be output to the coding unit determiner 120 according to the at least one maximum coding unit.

A coding unit according to an embodiment may be characterized by a maximum size and a depth. The depth denotes a number of times the coding unit is spatially split from the maximum coding unit, and as the depth increases, deeper coding units according to depths may be split from the maximum coding unit to a minimum coding unit. A depth of the maximum coding unit is an uppermost depth and a depth of the minimum coding unit is a lowermost depth. Since a size of a coding unit corresponding to each depth decreases as the depth of the maximum coding unit increases, a coding unit corresponding to an upper depth may include a plurality of coding units corresponding to lower depths.

As described above, the image data of the current picture is split into the maximum coding units according to a maximum size of the coding unit, and each of the maximum coding units may include deeper coding units that are split according to depths. Since the maximum coding unit according to an embodiment is split according to depths, the image data of a spatial domain included in the maximum coding unit may be hierarchically classified according to depths.

A maximum depth and a maximum size of a coding unit, which limit a total number of times a height and a width of the maximum coding unit are hierarchically split, may be previously set.

The coding unit determiner 120 encodes at least one split region obtained by splitting a region of the maximum coding unit according to depths, and determines a depth to output final encoding results according to the at least one split region. In other words, the coding unit determiner 120 determines a coded depth by encoding the image data in the deeper coding units according to depths, according to the maximum coding unit of the current picture, and selecting a depth having a least encoding error. The determined coded depth and the image data according to the maximum coding unit are output.

The image data in the maximum coding unit is encoded based on the deeper coding units corresponding to at least one depth equal to or less than the maximum depth, and encoding results are compared based on each of the deeper coding units. A depth having the least encoding error may be selected after comparing encoding errors of the deeper coding units. At least one coded depth may be selected for each maximum coding unit.

A size of the maximum coding unit is split as a coding unit is hierarchically split according to depths, and a number of coding units increases. Even if coding units correspond to the same depth in one maximum coding unit, it is determined whether to split each of the coding units corresponding to the same depth to a lower depth by measuring an encoding error of the data of each coding unit, separately. Accordingly, even when data is included in one maximum coding unit, the encoding errors according to depths may differ according to regions, and thus the coded depths may differ according to regions. Thus, one or more coded depths may be set for one maximum coding unit, and the data of the maximum coding unit may be divided according to coding units of the one or more coded depths.

Accordingly, the coding unit determiner 120 according to an embodiment may determine coding units having a tree structure included in a current maximum coding unit. The 'coding units having a tree structure' according to an exemplary embodiment include coding units corresponding to a depth determined to be a coded depth, from among all deeper coding units included in the maximum coding unit. A coding unit of a coded depth may be hierarchically determined according to depths in the same region of the maximum coding unit, and may be independently determined in different regions. Similarly, a coded depth in a current region may be independently determined from a coded depth in another region.

A maximum depth according to an embodiment is an index related to a number of times splitting is performed from a maximum coding unit to a minimum coding unit. A first maximum depth according to an embodiment may denote a total number of times splitting is performed from the maximum coding unit to the minimum coding unit. A second maximum depth according to an embodiment may denote a total number of depth levels from the maximum coding unit to the minimum coding unit. For example, when a depth of the maximum coding unit is 0, a depth of a coding unit in which the maximum coding unit is split once may be set to 1, and a depth of a coding unit in which the maximum coding unit is split twice may be set to 2. In this case, if the minimum coding unit is a coding unit obtained by splitting the maximum coding unit four times, 5 depth levels of depths 0, 1, 2, 3 and 4 exist, and thus the first maximum depth may be set to 4 and the second maximum depth may be set to 5.

Prediction encoding and frequency transformation may be performed according to the maximum coding unit. The prediction encoding and the transformation are also performed based on the deeper coding units according to a depth equal to or depths less than the maximum depth, according to the maximum coding unit.

Since a number of deeper coding units increases whenever the maximum coding unit is split according to depths, encoding including the prediction encoding and the frequency transformation has to be performed on all of the deeper coding units generated as the depth increases. For convenience of explanation, the prediction encoding and the frequency transformation will now be described based on a coding unit of a current depth, from among at least one maximum coding unit.

The video encoding apparatus 100 according to an embodiment may variously select a size or shape of a data unit for encoding the image data. In order to encode the image data, operations, such as prediction encoding, frequency transformation, and entropy encoding, are performed, and at this time, the same data unit may be used for all operations or different data units may be used for each operation.

For example, the video encoding apparatus 100 may select not only a coding unit for encoding the image data, but also a data unit different from the coding unit so as to perform the prediction encoding on the image data in the coding unit.

In order to perform prediction encoding in the maximum coding unit, the prediction encoding may be performed based on a coding unit corresponding to a coded depth, i.e., based on a coding unit that is no longer split into coding units corresponding to a lower depth. Hereinafter, the coding unit that is no longer split and becomes a basis unit for prediction encoding will now be referred to as a 'prediction unit'. A partition obtained by splitting the prediction unit may include a prediction unit and a data unit obtained by splitting at least one of a height and a width of the prediction unit.

For example, when a coding unit of 2N×2N (where N is a positive integer) is no longer split, the coding unit may become a prediction unit of 2N×2N and a size of a partition may be 2N×2N, 2N×N, N×2N, or N×N. Examples of a partition type include symmetrical partitions that are obtained by symmetrically splitting a height or width of the prediction unit, partitions obtained by asymmetrically splitting the height or width of the prediction unit, such as 1:n or n:1, partitions that are obtained by geometrically splitting the prediction unit, and partitions having arbitrary shapes.

A prediction mode of the prediction unit may be at least one of an intra mode, a inter mode, and a skip mode. For example, the intra mode or the inter mode may be performed on the partition of 2N×2N, 2N×N, N×2N, or N×N. The skip mode may be performed only on the partition of 2N×2N. The encoding is independently performed on one prediction unit in a coding unit, thereby selecting a prediction mode having a least encoding error.

The video encoding apparatus 100 according to an embodiment may also perform the frequency transformation on the image data in a coding unit based not only on the coding unit for encoding the image data but also based on a data unit that is different from the coding unit.

In order to perform the frequency transformation in the coding unit, the frequency transformation may be performed based on a data unit having a size smaller than or equal to the coding unit. For example, the data unit for the frequency transformation may include a data unit for an intra mode and a data unit for an inter mode.

A data unit used as a base of the frequency transformation will now be referred to as a 'transformation unit'. Similarly to the coding unit, the transformation unit in the coding unit may be recursively split into smaller sized transformation units, and thus, residual data in the coding unit may be divided according to the transformation unit having a tree structure according to transformation depths.

A transformation depth indicating a number of times splitting is performed to reach the transformation unit by splitting the height and width of the coding unit may also be set in the transformation unit according to an embodiment. For example, in a current coding unit of 2N×2N, a transformation depth may be 0 when the size of a transformation unit is 2N×2N, may be 1 when the size of a transformation unit is N×N, and may be 2 when the size of a transformation unit is N/2×N/2. That is, the transformation unit having the tree structure may also be set according to transformation depths.

Encoding information according to coding units corresponding to a coded depth requires not only information about the coded depth but also about information related to prediction encoding and frequency transformation. Accordingly, the coding unit determiner 120 not only determines a coded depth having a least encoding error but also determines a partition type in a prediction unit, a prediction mode according to prediction units, and a size of a transformation unit for frequency transformation.

Coding units having a tree structure in a maximum coding unit and a method of determining a partition according to an embodiment will be explained in detail below with reference to FIGS. 3 through 12.

The coding unit determiner 120 may measure an encoding error of deeper coding units according to depths by using Rate-Distortion (RD) Optimization based on Lagrangian multipliers.

The output unit 130 outputs the image data of the maximum coding unit, which is encoded based on the at least one coded depth determined by the coding unit determiner 120, and information about the encoding mode according to the coded depth, in bitstreams.

The encoded image data may be obtained by encoding residual data of an image.

The information about the encoding mode according to coded depths may include information about the coded depth, the partition type in the prediction unit, the prediction mode, and the size of the transformation unit.

The information about the coded depth may be defined by using split information according to depths, which indicates whether encoding is performed on coding units of a lower depth instead of a current depth. If the current depth of the current coding unit is the coded depth, the encoding is performed on the current coding unit of the current depth, and thus the split information may be defined not to split the current coding unit to a lower depth. Alternatively, if the current depth of the current coding unit is not the coded depth, the encoding is performed on the coding unit of the lower depth, and thus the split information may be defined to split the current coding unit to obtain the coding units of the lower depth.

If the current depth is not the coded depth, encoding is performed on the coding unit that is split into the coding unit of the lower depth. Since at least one coding unit of the lower depth exists in one coding unit of the current depth, the encoding is repeatedly performed on each coding unit of the lower depth, and thus the encoding may be recursively performed for the coding units having the same depth.

Since the coding units having a tree structure are determined for one maximum coding unit and information about at least one encoding mode is determined for a coding unit of a coded depth, information about at least one encoding mode may be determined for one maximum coding unit. A coded depth of the data of the maximum coding unit may be different according to locations since the data is hierarchically split according to depths, and thus information about the coded depth and the encoding mode may be set for the data.

Accordingly, the output unit 130 according to an embodiment may assign encoding information about a corresponding coded depth and an encoding mode to at least one of the coding unit, the prediction unit, and a minimum unit included in the maximum coding unit.

The minimum unit according to an embodiment is a rectangular data unit obtained by splitting the minimum coding unit constituting a lowermost depth by 4. Alternatively, the minimum unit may be a maximum rectangular data unit that may be included in all of the coding units, prediction units, partition units, and transformation units included in the maximum coding unit.

For example, the encoding information output through the output unit 130 may be classified into encoding information according to deeper coding units according to depths, and encoding information according to prediction units. The encoding information according to the deeper coding units according to depths may include the information about the prediction mode and about the size of the partitions. The encoding information according to the prediction units may include information about an estimated direction of an inter mode, about a reference image index of the inter mode, about a motion vector, about a chroma component of an intra mode, and about an interpolation method of the intra mode. Information about a maximum size of the coding unit defined according to pictures, slices, or GOPs, and information about a maximum depth may be inserted into a header of a bitstream.

In the video encoding apparatus 100 according to a simplest embodiment, the deeper coding unit is a coding unit obtained by dividing a height or width of a coding unit of an upper depth, which is one layer above, by two. In other words, when the size of the coding unit of the current depth is 2N×2N, the size of the coding unit of the lower depth is N×N. The coding unit of the current depth having the size of 2N×2N may include a maximum number of 4 coding units of the lower depth.

Accordingly, the video encoding apparatus 100 according to an embodiment may form the coding units having the tree structure by determining coding units having an optimum shape and an optimum size for each maximum coding unit, based on the size of the maximum coding unit and the maximum depth determined considering characteristics of the current picture. Since encoding may be performed on each maximum coding unit by using any one of various prediction modes and frequency transformations, an optimum encoding mode may be determined considering image characteristics of the coding unit of various image sizes.

Thus, if an image having high resolution or a large data amount is encoded in a conventional macroblock, a number of macroblocks per picture excessively increases. Accordingly, a number of pieces of compressed information generated for each macroblock increases, and thus it is difficult to transmit the compressed information and data compression efficiency decreases. However, by using the video encoding apparatus 100 according to an embodiment, image compression efficiency may be increased since a coding unit is adjusted while considering characteristics of an image while increasing a maximum size of a coding unit while considering a size of the image.

Figure 2:
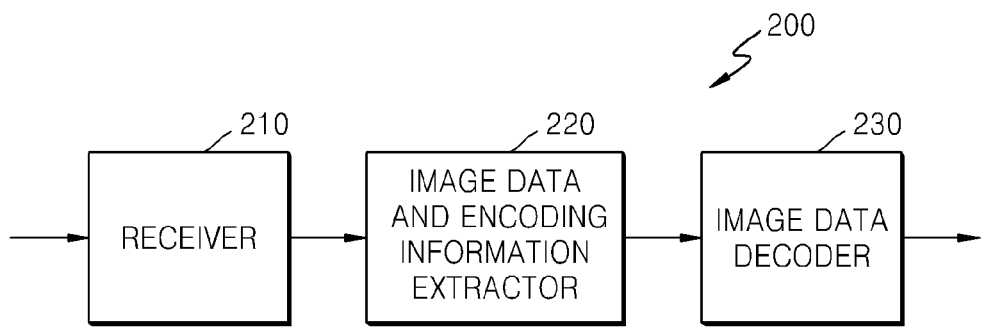
FIG. 2 is a block diagram of a video decoding apparatus according to an exemplary embodiment.

FIG. 2 is a block diagram of a video decoding apparatus 200 according to an exemplary embodiment.

The video decoding apparatus 200 according to an embodiment includes a receiver 210, an image data and encoding information extractor 220, and an image data decoder 230. Definitions of various terms, such as a coding unit, a depth, a prediction unit, a transformation unit, and information about various encoding modes, for various operations of the video decoding apparatus 200 according to an embodiment are identical to those described with reference to FIG. 1 and the video encoding apparatus 100.

The receiver 210 receives and parses a bitstream of an encoded video. The image data and encoding information extractor 220 extracts encoded image data for each coding unit from the parsed bitstream, wherein the coding units have a tree structure according to each maximum coding unit, and outputs the extracted image data to the image data decoder 230. The image data and encoding information extractor 220 may extract information about a maximum size of a coding unit of a current picture, from a header about the current picture.

The image data and encoding information extractor 220 extracts information about a coded depth and an encoding mode for the coding units having the tree structure according to each maximum coding unit, from the parsed bitstream. The extracted information about the coded depth and the encoding mode is output to the image data decoder 230. In other words, the image data in a bit stream is split into the maximum coding unit so that the image data decoder 230 decodes the image data for each maximum coding unit.

The information about the coded depth and the encoding mode according to the maximum coding unit may be set for information about at least one coded depth, and information about an encoding mode according to each coded depth may include information about a partition type of a corresponding coding unit corresponding to the coded depth, a prediction mode, and a size of a transformation unit. Split information according to depths may be extracted as the information about the coded depth.

The information about the coded depth and the encoding mode according to each maximum coding unit extracted by the image data and encoding information extractor 220 is information about a coded depth and an encoding mode determined to generate a least encoding error when an encoder, such as the video encoding apparatus 100, repeatedly performs encoding for each deeper coding unit according to depths according to each maximum coding unit. Accordingly, the video decoding apparatus 200 may restore an image by decoding the image data according to an encoding mode that generates the least encoding error.

Since encoding information about the coded depth and the encoding mode according to an embodiment may be assigned to a predetermined data unit from among a corresponding coding unit, a prediction unit, and a minimum unit, the image data and encoding information extractor 220 may extract the information about the coded depth and the encoding mode according to the predetermined data units. When the information about the coded depth of the corresponding maximum coding unit and the encoding mode is recorded according to the predetermined data units, the predetermined data units having the same information about the coded depth and the encoding mode may be inferred to be the data units included in the same maximum coding unit.

The image data decoder 230 restores the current picture by decoding the image data in each maximum coding unit based on the information about the coded depth and the encoding mode according to the maximum coding units. In other words, the image data decoder 230 may decode the encoded image data based on the extracted information about the partition type, the prediction mode, and the transformation unit for each coding unit from among the coding units having the tree structure included in each maximum coding unit. A decoding process may include prediction including intra prediction and motion compensation, and inverse frequency transformation.

The image data decoder 230 may perform intra prediction or motion compensation according to a partition and a prediction mode of each coding unit, based on the information about the partition type and the prediction mode of the prediction unit of the coding unit according to coded depths.

The image data decoder 230 may perform inverse frequency transformation according to each transformation unit in the coding unit, based on the information about the size of the transformation unit of the coding unit according to coded depths, so as to perform the inverse frequency transformation according to maximum coding units.

The image data decoder 230 may determine a coded depth of a current maximum coding unit by using split information according to depths. If the split information indicates that image data is no longer split in the current depth, the current depth is a coded depth. Accordingly, the image data decoder 230 may decode encoded data of the current depth by using the information about the partition type of the prediction unit, the prediction mode, and the size of the transformation unit for image data of the current maximum coding unit.

In other words, data units containing the encoding information including the same split information may be gathered by observing the encoding information set assigned for the predetermined data unit from among the coding unit, the prediction unit, and the minimum unit, and the gathered data units may be considered to be one data unit to be decoded by the image data decoder 230 in the same encoding mode.

The video decoding apparatus 200 according to an embodiment may obtain information about a coding unit that generates the least encoding error when encoding is recursively performed for each maximum coding unit, and may use the information to decode the current picture. In other words, the coding units having the tree structure determined to be the optimum coding units in each maximum coding unit may be decoded.

Accordingly, even if image data has high resolution and a large amount of data, the image data may be efficiently decoded and restored according to a size of a coding unit and an encoding mode, which are adaptively determined according to characteristics of an image, by using information about an optimum encoding mode received from an encoder.

A method of determining coding units having a tree structure, a prediction unit, and a transformation unit according to an exemplary embodiment will now be described with reference to FIGS. 3 through 13.

Figure 3:
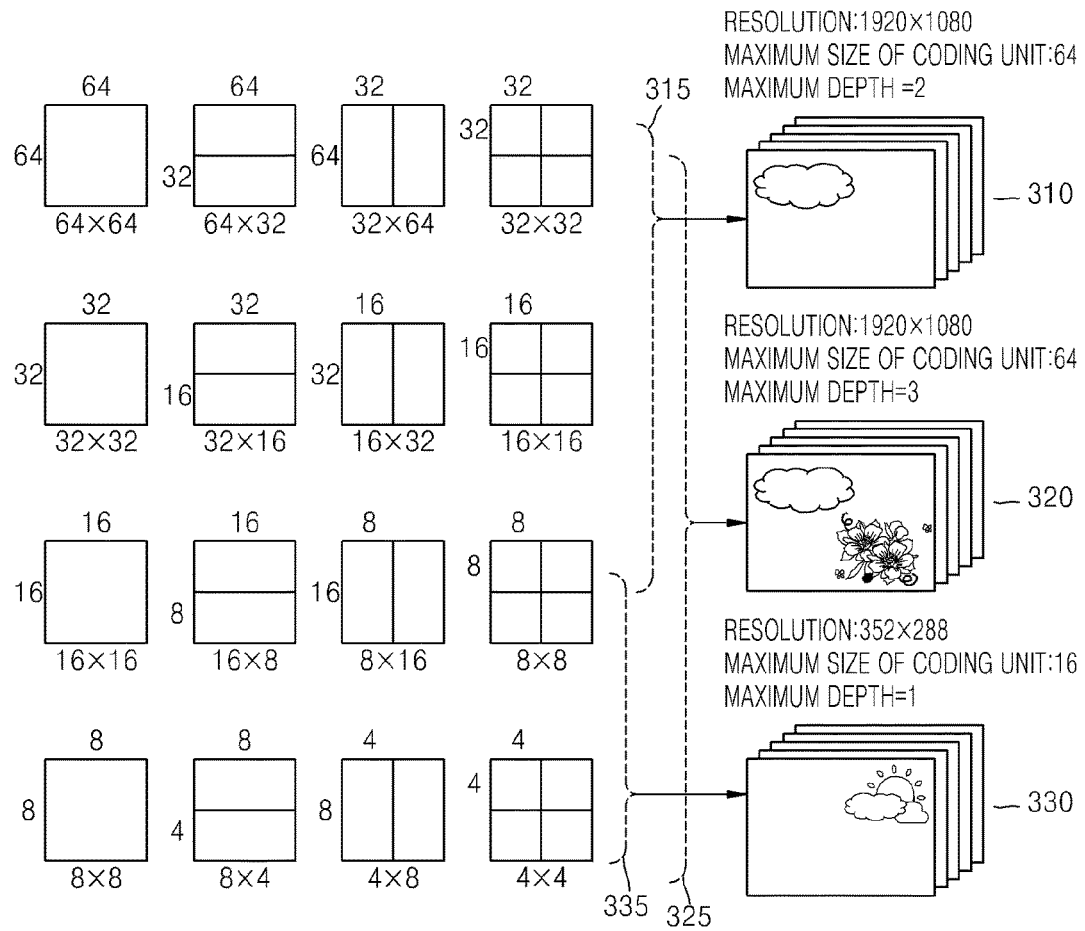
FIG. 3 is a diagram for explaining a concept of coding units according to an exemplary embodiment.

FIG. 3 is a diagram for explaining a concept of hierarchical coding units.

A size of a coding unit may be expressed in width×height, and examples of the size of the coding unit may include 64×64, 32×32, 16×16, and 8×8. A coding unit of 64×64 may be split into partitions of 64×64, 64×32, 32×64, or 32×32, and a coding unit of 32×32 may be split into partitions of 32×32, 32×16, 16×32, or 16×16, a coding unit of 16×16 may be split into partitions of 16×16, 16×8, 8×16, or 8×8, and a coding unit of 8×8 may be split into partitions of 8×8, 8×4, 4×8, or 4×4.

In video data 310, a resolution is set to 1920×1080, a maximum size of a coding unit is set to 64, and a maximum depth is set to 2. In video data 320, a resolution is set to 1920×1080, a maximum size of a coding unit is set to 64, and a maximum depth is set to 3. In video data 330, a resolution is set to 352×288, a maximum size of a coding unit is set to 16, and a maximum depth is set to 1. The maximum depth shown in FIG. 3 denotes a total number of splits from a maximum coding unit to a minimum decoding unit.

If a resolution is high or a data amount is large, a maximum size of a coding unit may be large so as to not only increase encoding efficiency but also to accurately reflect characteristics of an image. Accordingly, the maximum size of the coding unit of the video data 310 and 320 having the higher resolution than the video data 330 may be 64.

Since the maximum depth of the video data 310 is 2, coding units 315 of the video data 310 may include a maximum coding unit having a long axis size of 64, and coding units having long axis sizes of 32 and 16 since depths are increased to two layers by splitting the maximum coding unit twice. Meanwhile, since the maximum depth of the video data 330 is 1, coding units 335 of the video data 330 may include a maximum coding unit having a long axis size of 16, and coding units having a long axis size of 8 since depths are increased to one layer by splitting the maximum coding unit once.

Since the maximum depth of the video data 320 is 3, coding units 325 of the video data 320 may include a maximum coding unit having a long axis size of 64, and coding units having long axis sizes of 32, 16, and 8 since the depths are increased to 3 layers by splitting the maximum coding unit three times. As a depth increases, detailed information may be more precisely expressed.

Figure 4:
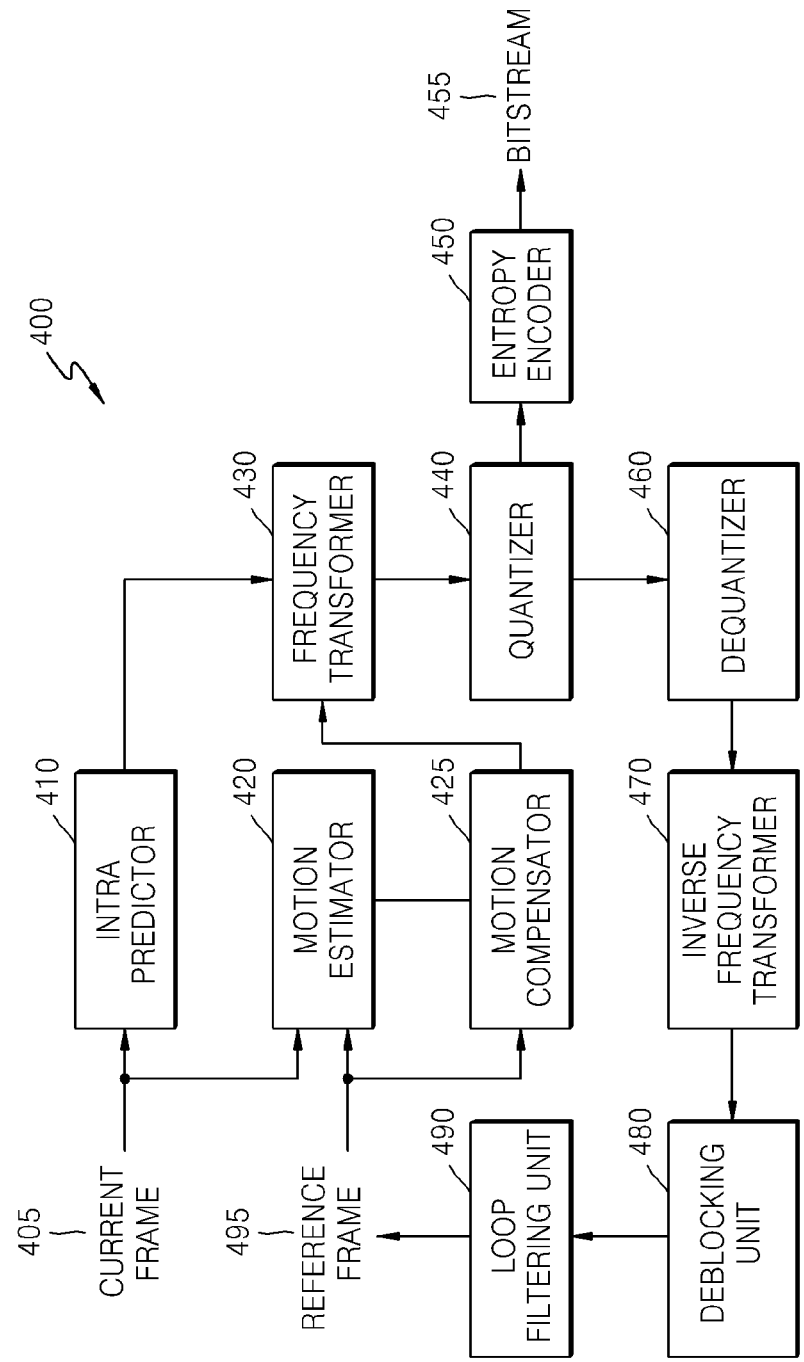
FIG. 4 is a block diagram of an image encoder based on coding units, according to an exemplary embodiment.

FIG. 4 is a block diagram of an image encoder 400 based on coding units, according to an exemplary embodiment.

The image encoder 400 according to an embodiment performs operations of the coding unit determiner 120 of the video encoding apparatus 100 to encode image data. In other words, an intra predictor 410 performs intra prediction on coding units in an intra mode, from among a current frame 405, and a motion estimator 420 and a motion compensator 425 perform inter estimation and motion compensation on coding units in an inter mode from among the current frame 405 by using the current frame 405 and a reference frame 495.

Data output from the intra predictor 410, the motion estimator 420, and the motion compensator 425 is output as a quantized transformation coefficient through a frequency transformer 430 and a quantizer 440. The quantized transformation coefficient is restored as data in a spatial domain through an inverse quantizer 460 and an inverse frequency transformer 470, and the restored data in the spatial domain is output as the reference frame 495 after being post-processed through a deblocking unit 480 and a loop filtering unit 490. The quantized transformation coefficient may be output as a bitstream 455 through an entropy encoder 450.

In order for the image encoder 400 to be applied to the video encoding apparatus 100 according to an embodiment, all elements of the image encoder 400, i.e., the intra predictor 410, the motion estimator 420, the motion compensator 425, the frequency transformer 430, the quantizer 440, the entropy encoder 450, the inverse quantizer 460, the inverse frequency transformer 470, the deblocking unit 480, and the loop filtering unit 490, have to perform operations based on each coding unit from among coding units having a tree structure while considering the maximum depth of each maximum coding unit.

Specifically, the intra predictor 410, the motion estimator 420, and the motion compensator 425 have to determine partitions and a prediction mode of each coding unit from among the coding units having the tree structure while considering the maximum size and the maximum depth of a current maximum coding unit, and the frequency transformer 430 has to determine the size of the transformation unit in each coding unit from among the coding units having the tree structure.

Figure 5:
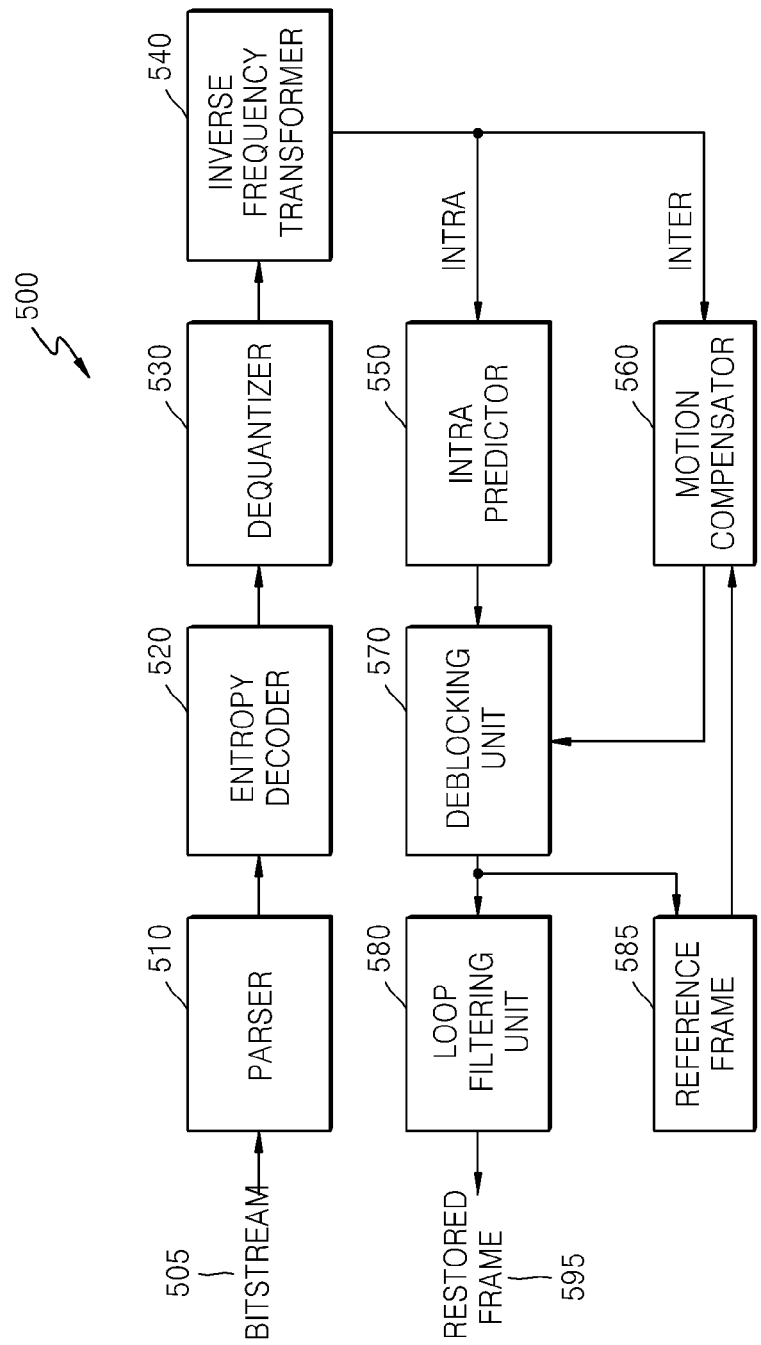
FIG. 5 is a block diagram of an image decoder based on coding units, according to an exemplary embodiment.

FIG. 5 is a block diagram of an image decoder 500 based on coding units, according to an exemplary embodiment.

A parser 510 parses encoded image data to be decoded and information about encoding required for decoding from a bitstream 505. The encoded image data is output as inverse quantized data through an entropy decoder 520 and an inverse quantizer 530 (i.e., dequantizer), and the inverse quantized data is restored to image data in a spatial domain through an inverse frequency transformer 540.

An intra predictor 550 performs intra prediction on coding units in an intra mode with respect to the image data in the spatial domain, and a motion compensator 560 performs motion compensation on coding units in an inter mode by using a reference frame 585.

The data in the spatial domain, which passed through the intra predictor 550 and the motion compensator 560, may be output as a restored frame 595 after being post-processed through a deblocking unit 570 and a loop filtering unit 580. The data, which is post-processed through the deblocking unit 570 and the loop filtering unit 580, may be output as the reference frame 585.

In order to decode the image data in the image data decoder 230 of the video decoding apparatus 200, the image decoder 500 may perform operations that are performed after operations of the parser 510 are performed.

In order for the image decoder 500 to be applied to the video decoding apparatus 200 according to an embodiment, all elements of the image decoder 500, i.e., the parser 510, the entropy decoder 520, the inverse quantizer 530, the inverse frequency transformer 540, the intra predictor 550, the motion compensator 560, the deblocking unit 570, and the loop filtering unit 580, have to perform operations based on coding units having a tree structure for each maximum coding unit.

Specifically, the intra predictor 550 and the motion compensator 560 have to determine partitions and a prediction mode for each of the coding units having the tree structure, and the inverse frequency transformer 540 has to determine a size of a transformation unit for each coding unit.

Figure 6:
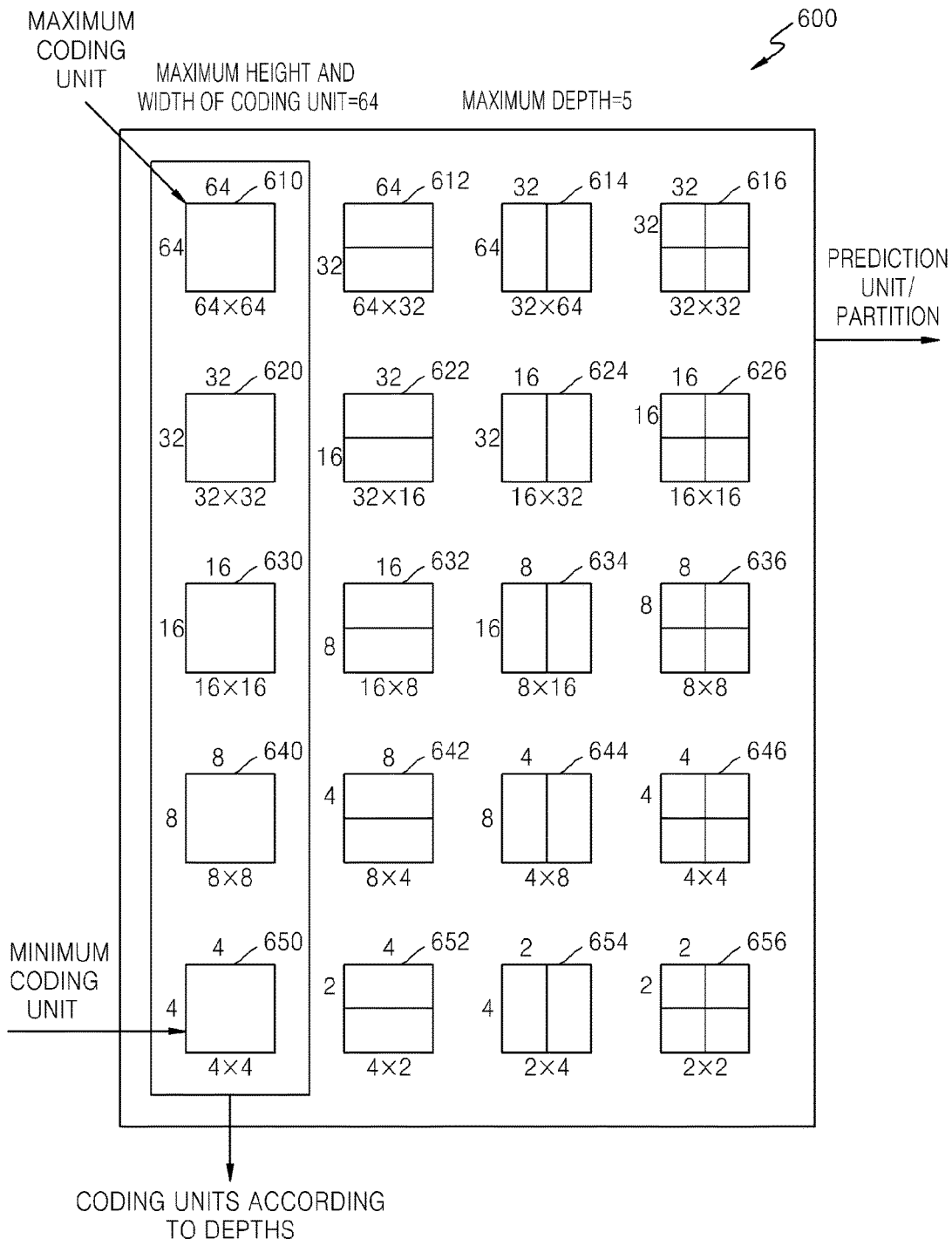
FIG. 6 is a diagram illustrating deeper coding units according to depths and partitions, according to an exemplary embodiment.

FIG. 6 is a diagram illustrating deeper coding units according to depths and partitions, according to an exemplary embodiment.

The video encoding apparatus 100 according to an embodiment and the video decoding apparatus 200 according to an embodiment use hierarchical coding units so as to consider characteristics of an image. A maximum height, a maximum width, and a maximum depth of coding units may be adaptively determined according to the characteristics of the image, or may be differently set by a user. Sizes of deeper coding units according to depths may be determined according to the maximum size of the coding unit which is previously set.

In a hierarchical structure 600 of coding units according to an embodiment, the maximum height and the maximum width of the coding units are each 64, and the maximum depth is 4. Since a depth increases along a vertical axis of the hierarchical structure 600 of the coding units according to an embodiment, a height and a width of the deeper coding unit are each split. A prediction unit and partitions, which are bases for prediction encoding of each deeper coding unit, are shown along a horizontal axis of the hierarchical structure 600 of the coding units.

In other words, a coding unit 610 is a maximum coding unit in the hierarchical structure 600 of the coding units, wherein a depth is 0 and a size, i.e., a height by width, is 64×64. The depth increases along the vertical axis, and a coding unit 620 having a size of 32×32 and a depth of 1, a coding unit 630 having a size of 16×16 and a depth of 2, a coding unit 640 having a size of 8×8 and a depth of 3, and a coding unit 650 having a size of 4×4 and a depth of 4 exist. The coding unit 650 having the size of 4×4 and the depth of 4 is a minimum coding unit.

The prediction unit and the partitions of a coding unit are arranged along the horizontal axis according to each depth. In other words, if the coding unit 610 having the size of 64×64 and the depth of 0 is a prediction unit, the prediction unit may be split into partitions included in the coding unit 610, i.e. a partition 610 having a size of 64×64, partitions 612 having the size of 64×32, partitions 614 having the size of 32×64, or partitions 616 having the size of 32×32.

Similarly, a prediction unit of the coding unit 620 having the size of 32×32 and the depth of 1 may be split into partitions included in the coding unit 620, i.e. a partition 620 having a size of 32×32, partitions 622 having a size of 32×16, partitions 624 having a size of 16×32, and partitions 626 having a size of 16×16.

Similarly, a prediction unit of the coding unit 630 having the size of 16×16 and the depth of 2 may be split into partitions included in the coding unit 630, i.e. a partition having a size of 16×16 included in the coding unit 630, partitions 632 having a size of 16×8, partitions 634 having a size of 8×16, and partitions 636 having a size of 8×8.

Similarly, a prediction unit of the coding unit 640 having the size of 8×8 and the depth of 3 may be split into partitions included in the coding unit 640, i.e. a partition having a size of 8×8 included in the coding unit 640, partitions 642 having a size of 8×4, partitions 644 having a size of 4×8, and partitions 646 having a size of 4×4.

Finally, the coding unit 650 having the size of 4×4 and the depth of 4 is the minimum coding unit and a coding unit of a lowermost depth. A prediction unit of the coding unit 650 is only assigned to a partition having a size of 4×4.

In order to determine a coded depth of the maximum coding unit 610, the coding unit determiner 120 of the video encoding apparatus 100 according to an embodiment has to perform encoding for coding units corresponding to each depth included in the maximum coding unit 610.

A number of deeper coding units according to depths including data in the same range and the same size increases as the depth increases. For example, four coding units corresponding to a depth of 2 are required to cover data that is included in one coding unit corresponding to a depth of 1. Accordingly, in order to compare encoding results of the same data according to depths, the coding unit corresponding to the depth of 1 and four coding units corresponding to the depth of 2 have to be each encoded.

In order to perform encoding according to each depth, a representative encoding error that is a least encoding error in the corresponding depth may be selected by performing encoding for each prediction unit in the deeper coding units, along the horizontal axis of the hierarchical structure 600 of the coding units. Alternatively, the least encoding error may be searched for by comparing representative encoding errors according to depths by performing encoding for each depth as the depth increases along the vertical axis of the hierarchical structure 600 of the coding units. A depth and a partition having the least encoding error in the maximum coding unit 610 may be selected as the coded depth and a partition type of the maximum coding unit 610.

Figure 7:
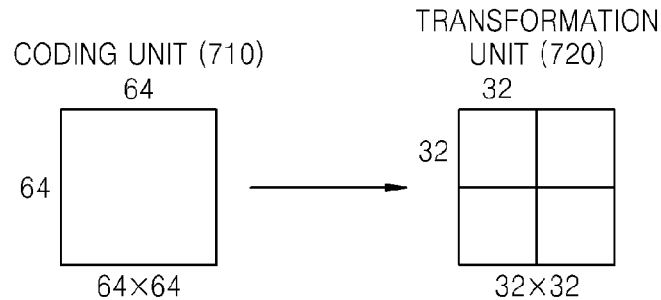
FIG. 7 is a diagram for explaining a relationship between a coding unit and transformation units, according to an exemplary embodiment.

FIG. 7 is a diagram for explaining a relationship between a coding unit 710 and transformation units 720, according to an exemplary embodiment.

The video encoding apparatus 100 according to an embodiment or the video decoding apparatus 200 according to an embodiment encodes or decodes an image according to coding units having sizes smaller than or equal to a maximum coding unit for each maximum coding unit. Sizes of transformation units for frequency transformation during encoding may be selected based on data units that are not larger than a corresponding coding unit.

For example, in the video encoding apparatus 100 according to an embodiment or the video decoding apparatus 200 according to an embodiment, if a size of the current coding unit 710 is 64×64, frequency transformation may be performed by using the transformation units 720 having a size of 32×32.

Data of the coding unit 710 having the size of 64×64 may be encoded by performing the frequency transformation on each of the transformation units having the size of 32×32, 16×16, 8×8, and 4×4, which are smaller than 64×64, and then a transformation unit having a least error may be selected.

Figure 8:
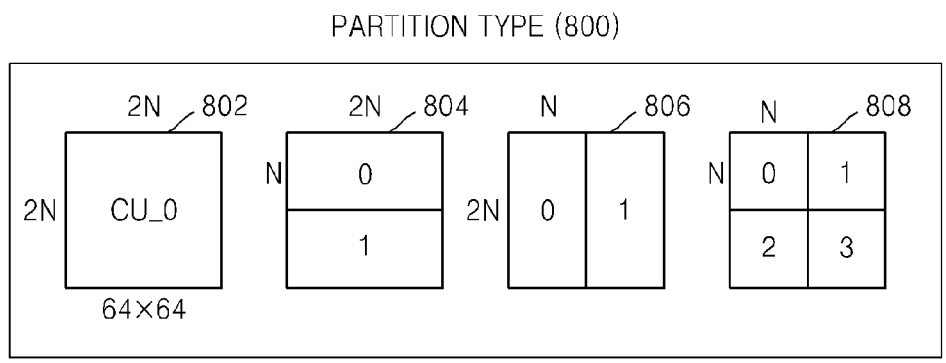
FIG. 8 is a diagram for explaining encoding information of coding units corresponding to a coded depth, according to an exemplary embodiment.
Figure 8:
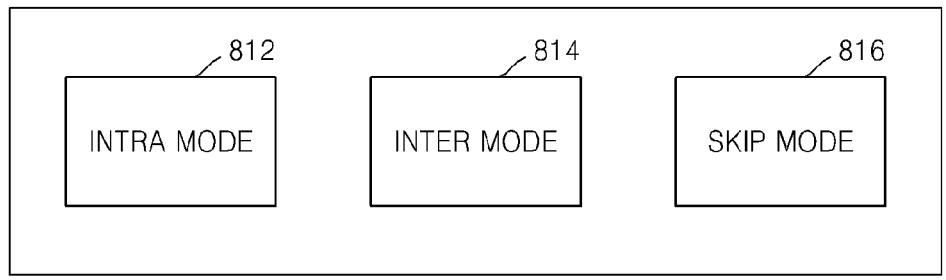
Figure 8:
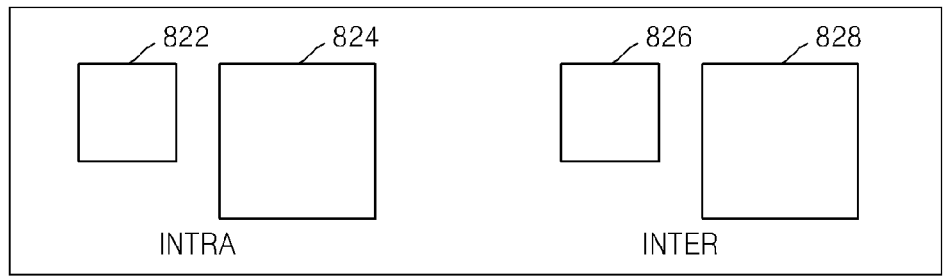

FIG. 8 is a diagram for explaining encoding information of coding units corresponding to a coded depth, according to an exemplary embodiment.

The output unit 130 of the video encoding apparatus 100 according to an embodiment may encode and transmit information 800 about a partition type, information 810 about a prediction mode, and information 820 about a size of a transformation unit for each coding unit corresponding to a coded depth, as information about an encoding mode.

The information 800 about the partition type indicates information about a shape of a partition obtained by splitting a prediction unit of a current coding unit, wherein the partition is a data unit for prediction encoding the current coding unit. For example, a current coding unit CU_0 having a size of 2N×2N may be split into any one of a partition 802 having a size of 2N×2N, a partition 804 having a size of 2N×N, a partition 806 having a size of N×2N, and a partition 808 having a size of N×N. Here, the information 800 about the partition type of the current coding unit is set to indicate one of the partition 804 having a size of 2N×N, the partition 806 having a size of N×2N, and the partition 808 having a size of N×N The information 810 about the prediction mode indicates a prediction mode of each partition. For example, the information 810 about the prediction mode may indicate a mode of prediction encoding performed on a partition indicated by the information 800, i.e., an intra mode 812, an inter mode 814, or a skip mode 816.

The information 820 about the size of the transformation unit indicates a transformation unit to be based on when frequency transformation is performed on a current coding unit. For example, the transformation unit may be a first intra transformation unit 822, a second intra transformation unit 824, a first inter transformation unit 826, or a second intra transformation unit 828.

Figure 9:
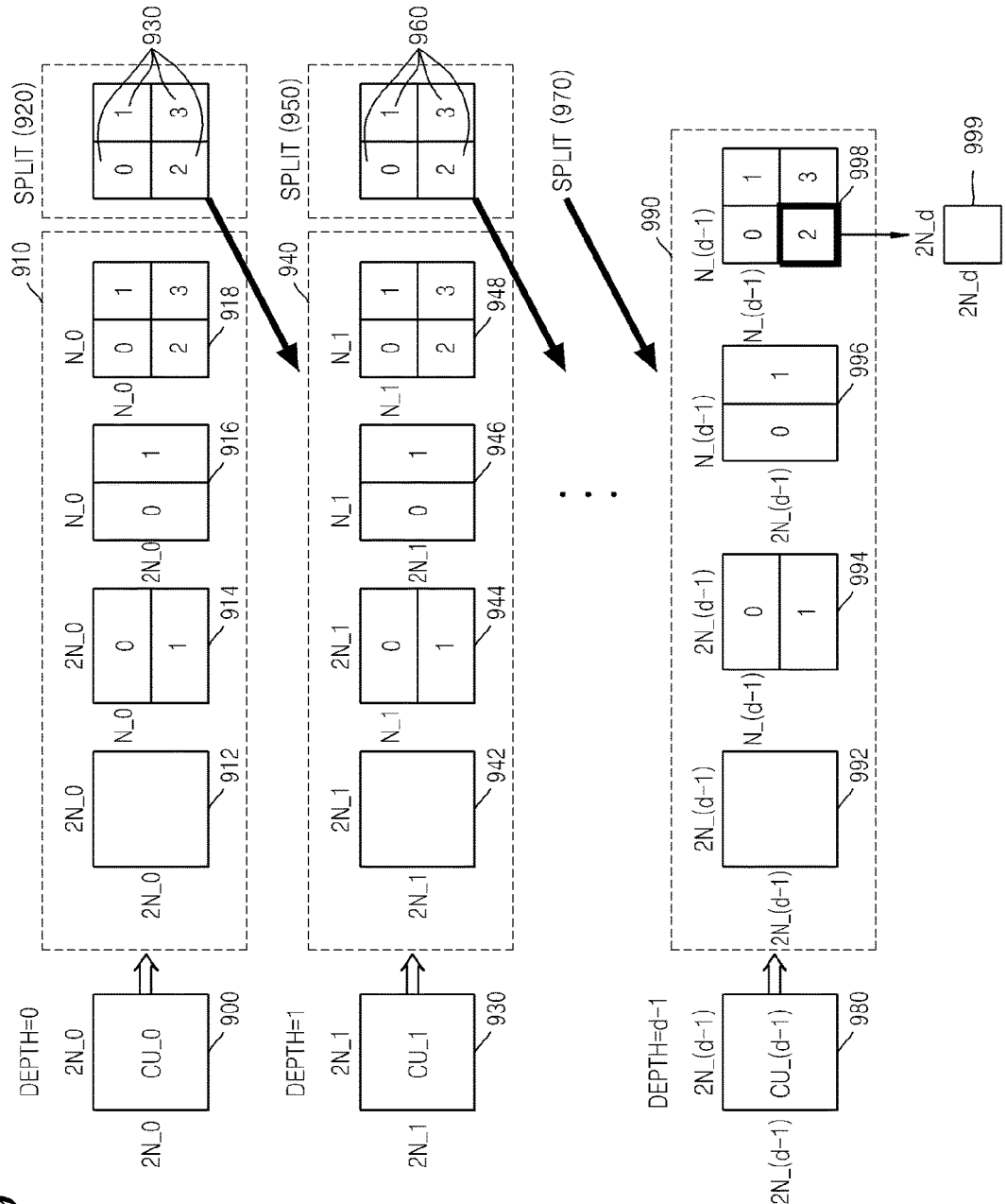
FIG. 9 is a diagram of deeper coding units according to depths according to an exemplary embodiment.

The image data and encoding information extractor 220 of the video decoding apparatus 200 according to an embodiment may extract and use the information 800 about the partition type, the information 810 about the prediction mode, and the information 820 about the size of the transformation unit for decoding according to each deeper coding unit FIG. 9 is a diagram of deeper coding units according to depths according to an exemplary embodiment.

Split information may be used to indicate a change of a depth. The spilt information indicates whether a coding unit of a current depth is split into coding units of a lower depth.

A prediction unit 910 for prediction encoding a coding unit 900 having a depth of 0 and a size of 2N_0×2N_0 may include partitions of a partition type 912 having a size of 2N_0×2N_0, a partition type 914 having a size of 2N_0×N_0, a partition type 916 having a size of N_0×2N_0, and a partition type 918 having a size of N_0×N_0. FIG. 9 only illustrates the partition types 912 through 918 which are obtained by symmetrically splitting the prediction unit 910, but a partition type is not limited thereto, and the partitions of the prediction unit 910 may include asymmetrical partitions, partitions having a predetermined shape, and partitions having a geometrical shape.

Prediction encoding has to be repeatedly performed on one partition having a size of 2N_0×2N_0, two partitions having a size of 2N_0×N_0, two partitions having a size of N_0×2N_0, and four partitions having a size of N_0×N_0, according to each partition type. The prediction encoding in an intra mode and an inter mode may be performed on the partitions having the sizes of 2N_0×2N_0, N_0×2N_0, 2N_0×N_0, and N_0×N_0. The prediction encoding in a skip mode may be performed only on the partition having the size of 2N_0×2N_0.

If an encoding error is smallest in one of the partition types 912 through 916 having the sizes of 2N_0×2N_0, 2N_0×N_0, and N_0×2N_0, the prediction unit 910 may be no longer split to a lower depth.

If the encoding error is the smallest in the partition type 918 having the size of N_0×N_0, a depth may be changed from 0 to 1 to split the partition type 918 in operation 920, and encoding may be repeatedly performed on coding units 930 having a depth of 2 and a size of N_0×N_0 to search for a least encoding error.

A prediction unit 940 for prediction encoding the coding unit 930 having a depth of 1 and a size of 2N_1×2N_1 (=N_0×N_0) may include partitions of a partition type 942 having a size of 2N_1×2N_1, a partition type 944 having a size of 2N_1×N_1, a partition type 946 having a size of N_1×2N_1, and a partition type 948 having a size of N_1×N_1.

If an encoding error is the smallest in the partition type 948 having the size of N_1×N_1, a depth may be changed from 1 to 2 to split the partition type 948 in operation 950, and encoding may be repeatedly performed on coding units 960, which have a depth of 2 and a size of N_2×N_2 to search for a least encoding error.

When a maximum depth is d, split information according to each depth may be set until a depth becomes d−1, and split information may be set until a depth becomes d−2. In other words, when encoding is performed until the depth is d−1 after a coding unit corresponding to a depth of d−2 is split in operation 970, a prediction unit 990 for prediction encoding a coding unit 980 having a depth of d−1 and a size of 2N_(d−1)×2N_(d−1) may include partitions of a partition type 992 having a size of 2N_(d−1)×2N_(d−1), a partition type 994 having a size of 2N_(d−1)×N_(d−1), a partition type 996 having a size of N_(d−1)×2N_(d−1), and a partition type 998 having a size of N_(d−1)×N_(d−1).

Prediction encoding may be repeatedly performed on one partition having a size of 2N_(d−1)×2N_(d−1), two partitions having a size of 2N_(d−1)×N_(d−1), two partitions having a size of N_(d−1)×2N_(d−1), four partitions having a size of N_(d−1)×N_(d−1) from among the partition types 992 through 998 to search for a partition type having a least encoding error.

Even when the partition type 998 having the size of N_(d−1)×N_(d−1) has the least encoding error, since a maximum depth is d, a coding unit CU_(d−1) having a depth of d−1 may be no longer split to a lower depth, a coded depth for a current maximum coding unit 900 may be determined to be d−1, and a partition type of the current maximum coding unit 900 may be determined to be N_(d−1)×N_(d−1). Since the maximum depth is d, split information for a coding unit 952 having a depth of d−1 is not set.

A data unit 999 may be referred to as a 'minimum unit' for the current maximum coding unit. A minimum unit according to an embodiment may be a rectangular data unit obtained by splitting a minimum coding unit having a lowermost coded depth by 4. By performing the encoding repeatedly, the video encoding apparatus 100 according to an embodiment may select a depth having a least encoding error by comparing encoding errors according to depths of the coding unit 900 to determine a coded depth, and may set a corresponding partition type and a prediction mode as an encoding mode of the coded depth.

As such, the least encoding errors according to depths are compared in all of the depths of 1 through d, and a depth having the least encoding error may be determined as a coded depth. The coded depth, the partition type of the prediction unit, and the prediction mode may be encoded and transmitted as information about an encoding mode. Since a coding unit has to be split from a depth of 0 to the coded depth, only split information of the coded depth has to be set to '0', and split information of depths excluding the coded depth has to be set to '1'.

The image data and encoding information extractor 220 of the video decoding apparatus 200 according to an embodiment may extract and use the information about the coded depth and the prediction unit of the coding unit 900 to decode the coding unit 912. The video decoding apparatus 200 according to an embodiment may determine a depth, in which split information is '0', as a coded depth by using split information according to depths, and may use information about an encoding mode of the corresponding depth for decoding.

Figure 10:
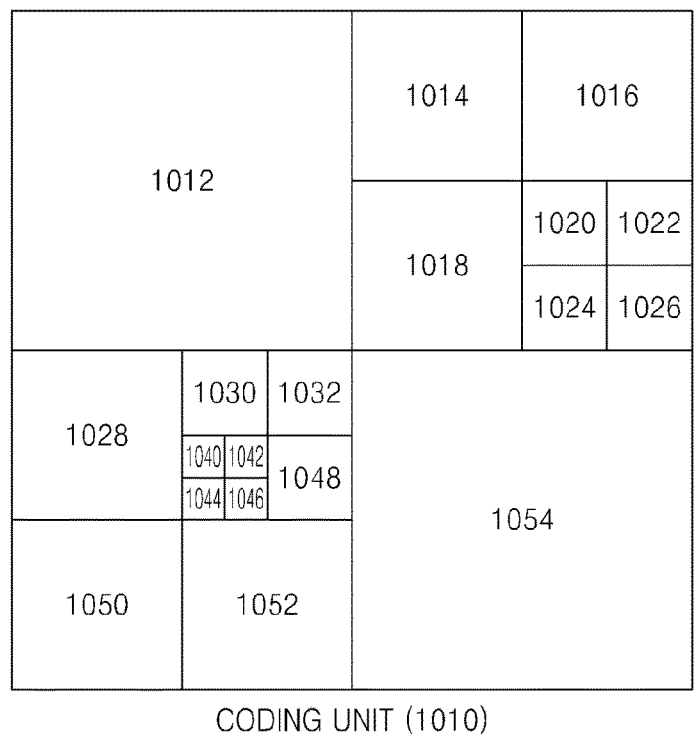
FIGS. 10, 11, and 12 are diagrams for explaining a relationship between coding units, prediction units, and frequency transformation units, according to an exemplary embodiment.
Figure 11:
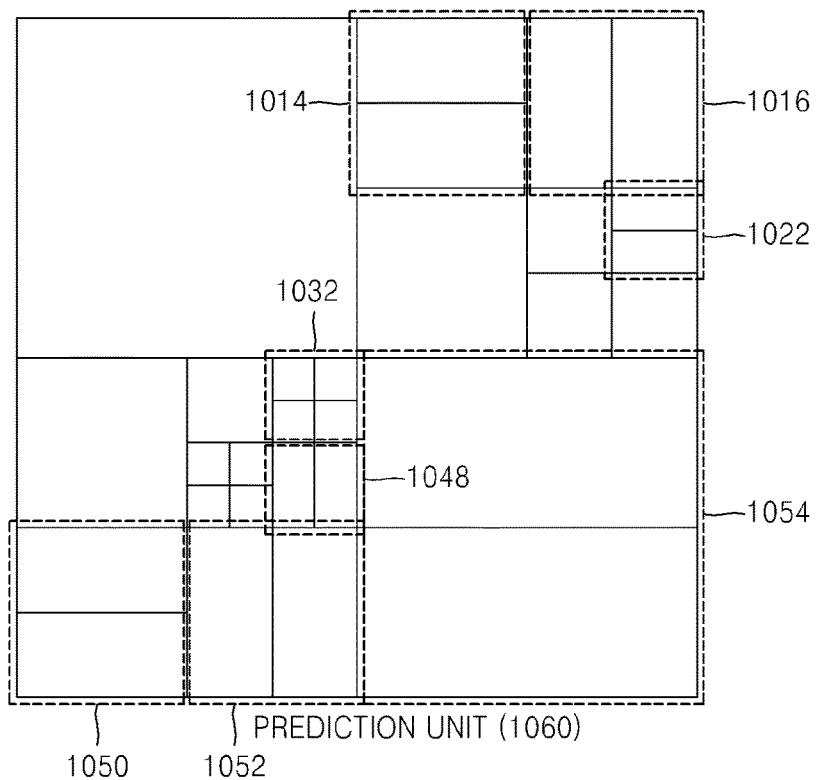
Figure 12:
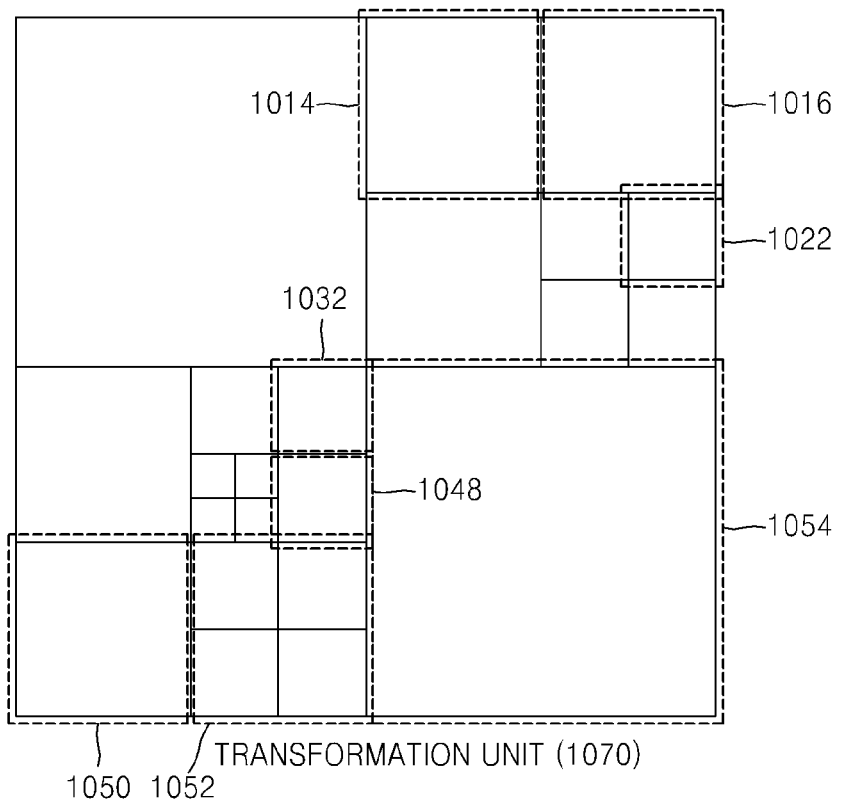

FIGS. 10, 11, and 12 are diagrams for explaining a relationship between coding units 1010, prediction units 1060, and frequency transformation units 1070, according to an exemplary embodiment.

The coding units 1010 are coding units corresponding to coded depths determined by the video encoding apparatus 100 according to an embodiment, in a maximum coding unit. The prediction units 1060 are partitions of prediction units of each of the coding units 1010, and the transformation units 1070 are transformation units of each of the coding units 1010.

When a depth of a maximum coding unit is 0 in the coding units 1010, depths of coding units 1012 and 1054 are 1, depths of coding units 1014, 1016, 1018, 1028, 1050, and 1052 are 2, depths of coding units 1020, 1022, 1024, 1026, 1030, 1032, and 1048 are 3, and depths of coding units 1040, 1042, 1044, and 1046 are 4.

In the prediction units 1060, some partitions 1014, 1016, 1022, 1032, 1048, 1050, 1052, and 1054 are obtained by splitting the coding units. In other words, partition types in the partitions 1014, 1022, 1050, and 1054 have a size of 2N×N, partition types in the partitions 1016, 1048, and 1052 have a size of N×2N, and a partition type of the partition 1032 has a size of N×N. Prediction units and partitions of the coding units 1010 are smaller than or equal to each coding unit.

Frequency transformation or inverse frequency transformation is performed on image data of the transformation unit 1052 in the transformation units 1070 in a data unit that is smaller than the transformation unit 1052. The transformation units 1014, 1016, 1022, 1032, 1048, 1050, 1052, and 1054 in the transformation units 1070 are different from those in the prediction units 1060 in terms of sizes or shapes. In other words, the video encoding apparatus 100 according to an embodiment and the video decoding apparatus 200 according to an embodiment may perform intra prediction/motion estimation/motion compensation, and frequency transformation/inverse frequency transformation individually on a data unit even in the same coding unit.

Accordingly, encoding may be recursively performed on each of coding units having a hierarchical structure in each region of a maximum coding unit to determine an optimum coding unit, and thus coding units having a recursive tree structure may be obtained. Encoding information may include split information about a coding unit, information about a partition type, information about a prediction mode, and information about a size of a transformation unit. Table 1 shows the encoding information that may be set by the video encoding apparatus 100 according to an embodiment and the video decoding apparatus 200 according to an embodiment.

N×2N, and N×N, which are obtained by symmetrically splitting a height or a width of a prediction unit, and asymmetrical partition types having sizes of 2N×nU, 2N×nD, nL×2N, and nR×2N, which are obtained by asymmetrically splitting the height or width of the prediction unit. The asymmetrical partition types having the sizes of 2N×nU and 2N×nD are respectively obtained by splitting the height of the prediction unit in 1:3 and 3:1, and the asymmetrical partition types having the sizes of nL×2N and nR×2N are respectively obtained by splitting the width of the prediction unit in 1:3 and 3:1

The size of the transformation unit may be set to be two types in the intra mode and two types in the inter mode. In other words, if split information of the transformation unit is 0, the size of the transformation unit is set to 2N×2N, which is the size of the current coding unit. If split information of the transformation unit is 1, the transformation units may be obtained by splitting the current coding unit. If a partition type of the current coding unit having the size of 2N×2N is a symmetrical partition type, a size of a transformation unit may be set to N×N, and if the partition type of the current coding unit is an asymmetrical partition type, the size of the transformation unit may be set to N/2×N/2.

The encoding information about coding units having a tree structure according to an embodiment may be assigned

TABLE 1

| Split Information 0 (Encoding on Coding Unit having Size of 2N × 2N and Current Depth of d) | | | | | Split Information 1 |
|---|---|---|---|---|---|
| Prediction Mode | Partition Type | | Size of Transformation Unit | | Repeatedly Encode Coding Units having Lower Depth of d + 1 |
| Intra Inter Skip (Only 2N × 2N) | Symmetrical Partition Type | Asymmetrical Partition Type | Split Information 0 of Transformation Unit | Split Information 1 of Transformation Unit | |
| | 2N × 2N 2N × N N × 2N N × N | 2N × nU 2N × nD nL × 2N nR × 2N | 2N × 2N | N × N (Symmetrical Partition Type) N/2 × N/2 (Asymmetrical Partition Type) | |

The output unit 130 of the video encoding apparatus 100 according to an embodiment may output the encoding information about the coding units having the tree structure, and the image data and encoding information extractor 220 of the video decoding apparatus 200 according to an embodiment may extract the encoding information about the coding units having the tree structure from a received bitstream.

Split information indicates whether a current coding unit is split into coding units of a lower depth. If split information of a current depth d is 0, a depth, in which a current coding unit is no longer split to a lower depth, is a coded depth, and thus information about a partition type, a prediction mode, and a size of a transformation unit may be defined for the coded depth. If the current coding unit is further split according to the split information, encoding has to be independently performed on four split coding units of a lower depth.

A prediction mode may be one of an intra mode, an inter mode, and a skip mode. The intra mode and the inter mode may be defined in all partition types, and the skip mode may be defined only in a partition type having a size of 2N×2N.

The information about the partition type may indicate symmetrical partition types having sizes of 2N×2N, 2N×N, to at least one of a coding unit corresponding to a coded depth, a prediction unit, and a minimum unit. The coding unit corresponding to the coded depth may include at least one of a prediction unit and a minimum unit containing the same encoding information.

Accordingly, it is determined whether adjacent data units are included in the same coding unit corresponding to the coded depth by comparing encoding information of the adjacent data units. A corresponding coding unit corresponding to a coded depth may be determined by using encoding information of a data unit, and thus a distribution of coded depths in a maximum coding unit may be determined.

Accordingly, if a current coding unit is predicted by referring to adjacent data units, encoding information of data units in deeper coding units adjacent to the current coding unit may be directly referred to and used.

Alternatively, if a current coding unit is prediction encoded by referring to adjacent data units, data units adjacent to the current coding unit in deeper coding units may be searched for by using encoding information of the data units, and the searched adjacent coding units may be referred to for prediction encoding the current coding unit.

Figure 13:
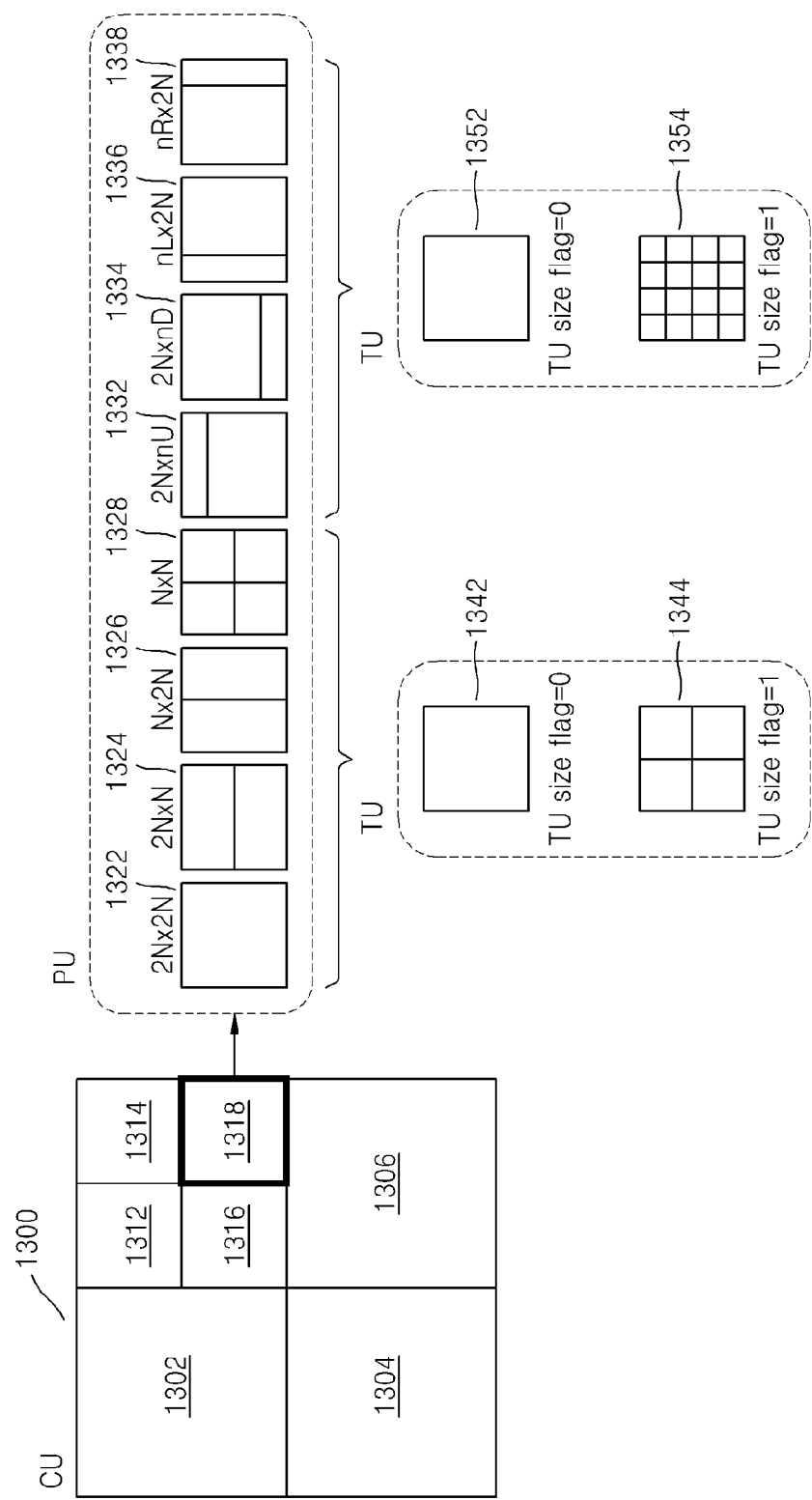
FIG. 13 is a diagram for explaining a relationship between a coding unit, a prediction unit, and a transformation unit, according to encoding mode information of Table 1.

FIG. 13 is a diagram for explaining a relationship between a coding unit, a prediction unit, and a transformation unit, according to the encoding mode information of Table 1.

A maximum coding unit 1300 includes coding units 1302, 1304, 1306, 1312, 1314, 1316, and 1318 of coded depths. Here, since the coding unit 1318 is a coding unit of a coded depth, split information may be set to 0. Information about a partition type of the coding unit 1318 having a size of 2N×2N may be set to be one of a partition type 1322 having a size of 2N×2N, a partition type 1324 having a size of 2N×N, a partition type 1326 having a size of N×2N, a partition type 1328 having a size of N×N, a partition type 1332 having a size of 2N×nU, a partition type 1334 having a size of 2N×nD, a partition type 1336 having a size of nL×2N, and a partition type 1338 having a size of nR×2N.

When the partition type is set to be symmetrical, i.e. the partition type 1322 having the size of 2N×2N, 1324 having the size of 2N×N, 1326 having the size of N×2N, or 1328 having the size of N×N, a transformation unit 1342 having a size of 2N×2N may be set if split information (TU size flag) of a transformation unit is 0, and a transformation unit 1344 having a size of N×N may be set if a TU size flag is 1.

When the partition type is set to be asymmetrical, i.e., the partition type 1332 having the size of 2N×nU, 1334 having the size of 2N×nD, 1336 having the size of nL×2N, or 1338 having the size of nR×2N, a transformation unit 1352 having a size of 2N×2N may be set if a TU size flag is 0, and a transformation unit 1354 having a size of N/2×N/2 may be set if a TU size flag is 1.

A process of encoding and decoding a syntax for parallel processing of video data in the entropy encoder 450 of the image encoding apparatus 400 according to an exemplary embodiment of FIG. 4 and the entropy decoder 520 of the image decoding apparatus 500 of FIG. 5 will now be explained in detail.

Figure 14:
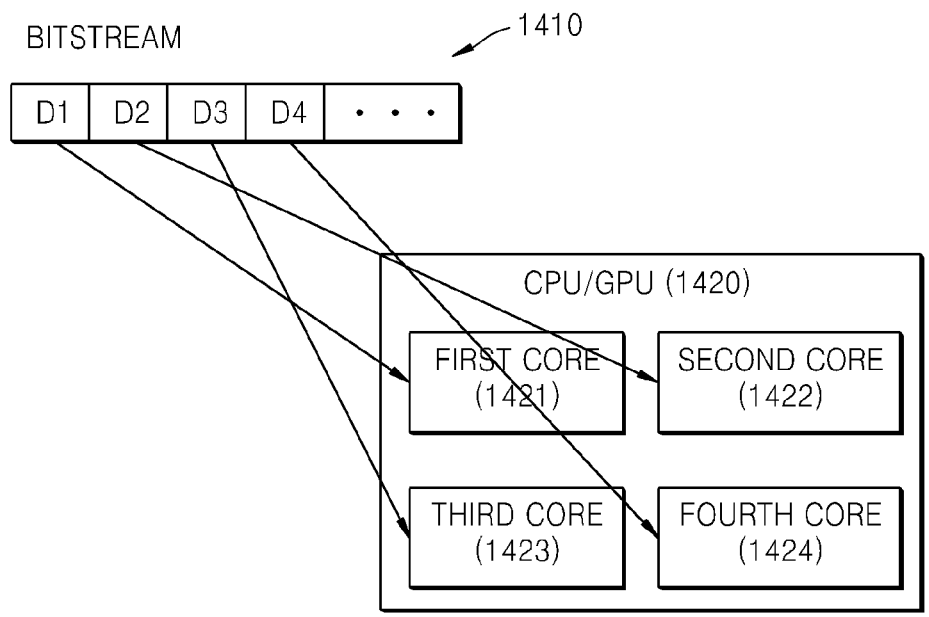
FIG. 14 is a reference diagram for explaining a concept of parallel processing of a video data unit, according to an exemplary embodiment.

FIG. 14 is a reference diagram for explaining a concept of parallel processing of a video data unit, according to an exemplary embodiment.

Referring to FIG. 14, when it is assumed that data units D1 through D4 of a bitstream 1410 may be independently encoded and decoded without depending on one another, the data units D1 through D4 may be assigned to multiple cores 1421 through 1424 of a central processing unit (CPU) or a graphics processing unit (GPU) 1420 that is provided in the video encoding/decoding apparatus and may be processed in parallel. For the parallel processing, information for determining whether the data units D1 through D4 are parallel-processable data units is required.

When it is assumed that one parallel processing type from among a plurality of parallel processing types that may be used for second data units having lower levels is applied according to an exemplary embodiment, the parallel processing type that is applied to the data units having the lower levels is indicated by including one parallel processing syntax information in a header of a first data unit having an upper level. Parallel processing flag information indicating whether the parallel processing type indicated by the parallel processing syntax information included in the header of the first data unit having the upper level is actually applied to the corresponding second data units is included in a header of each of the second data units having the lower levels.

For example, it is assumed that n (n is an integer) parallel processing types that may be applied to the second data units exist. A syntax parallel_processing_type_idc indicating a parallel processing type that may be used for at least one second data unit from among the n parallel processing types is included in the header of the first data unit having the upper level including the second data units. The parallel processing syntax parallel_processing_type_idc may have a value ranging from 0 to n. When the parallel processing syntax parallel_processing_type_idc has a value of 0, it may be indicated that no parallel processing type may be applied to the second data units having the lower levels. The parallel processing syntax parallel_processing_type_idc having a value ranging from 1 to n indicates that one parallel processing unit from among the n different parallel processing types may be used for the second data units. A parallel processing flag indicating whether the parallel processing type indicated by the parallel processing syntax parallel_processing_type_idc may be applied to the second data units may be included in the header of each of the second data units. When the parallel processing flag has a value of 0, it may be indicated that the corresponding second data units are data units to which the parallel processing type is not applied, and when the parallel processing flag has a value of 1, it may be indicated that the corresponding second data units are data units to which the parallel processing type is applied. When the parallel processing flag is set to 1, additional information for applying the parallel processing type indicated by the parallel processing syntax parallel_processing_type_idc may be additionally added to the header of each of the second data units, and the additional information for applying the parallel processing type during decoding may be decoded.

According to another exemplary embodiment, the parallel processing syntax parallel_processing_type_idc indicating a parallel processing type that is applied to the second data units having the lower levels from among a plurality of parallel processing types is included in the header of the first data unit having the upper level, and additional information for applying the parallel processing type indicated by the parallel processing syntax parallel_processing_type_idc is added to the header of each of the second data units having the lower levels. That is, according to another embodiment, assuming that the parallel processing type indicated by the parallel processing syntax parallel_processing_type_idc is applied to all of the second data units having the lower levels, the additional information for applying the parallel processing type may be included in the header of each of the second data units having the lower levels.

For example, the syntax parallel_processing_type_idc indicating a parallel processing type that may be used for at least one second data unit from among n parallel processing types is included in the header of the first data unit having the upper level including the second data units, like in an embodiment. Additional information needed to apply the parallel processing type indicated by the parallel processing syntax parallel_processing_type_idc may be included in the header of each of the second data units. The parallel processing type that is applied to the second data units having the lower levels may be determined by using the syntax parallel_processing_type_idc indicating the parallel processing type from the header of the first data unit during decoding, and the additional information for applying the parallel processing type may be read from the header of each of the second data units.

Figure 15:
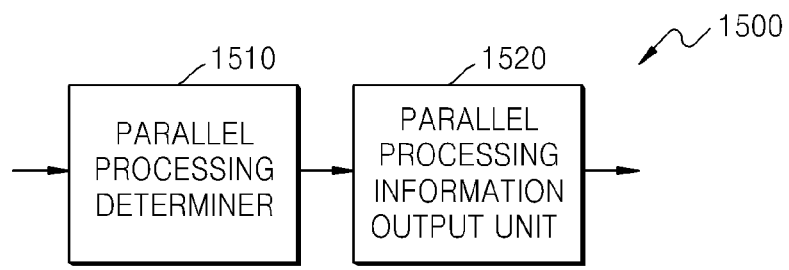
FIG. 15 is a block diagram illustrating an entropy encoding apparatus according to an exemplary embodiment.

FIG. 15 is a block diagram illustrating an entropy encoding apparatus 1500 according to an exemplary embodiment. The entropy encoding apparatus 1500 of FIG. 15 corresponds to the entropy encoder 450 of FIG. 4.

Referring to FIG. 15, the entropy encoding apparatus 1500 includes a parallel processing determiner 1510 and a parallel processing information output unit 1520 (e.g., parallel processing information output device, etc.).

The parallel processing determiner 1510 obtains encoded data of a first data unit that constitutes a video and second data units having levels lower than that of the first data unit, and determines whether a parallel-processable second data unit exists from among the second data units having the lower levels included in the first data unit. Whether the parallel-processable second data unit exists may be determined by determining whether the second data is processed by referring to data other than data that may be currently used. A data unit that is processed by referring to information about other data units is dependent and thus may not be processed before the other data units are processed. Accordingly, the parallel processing determiner 1510 determines the second data unit that may be processed without referring to other data to be a parallel-processable data unit.

The parallel processing determiner 1510 determines a parallel processing type that is applied to the second data unit from among a plurality of parallel processing types. The plurality of parallel processing types may be a tile, a wavefront parallel processing (WPP), and a slice.

The parallel processing information output unit 1520 includes parallel processing syntax information indicating the parallel processing type that is applied to the second data unit in a header of the first data unit. As described above, assuming that there exist three parallel processing types, that is, a tile, a WPP, and a slice as the plurality of parallel processing types, when the parallel processing syntax parallel_processing_type_idc has a value of 0, it is indicated that no parallel processing type may be applied to the second data units. When the parallel processing syntax parallel_processing_type_idc has a value of 1, it may be indicated that a second data unit that is processed by using a tile exists; when the parallel processing syntax parallel_processing_type_idc has a value of 2, it may be indicated that a second data unit that is processed by using a WPP exists; and when the parallel processing syntax parallel_processing_type_idc has a value of 3, a second data unit that is processed by using a slice exists.

The parallel processing information output unit 1520 according to an embodiment includes parallel processing flag information indicating whether the parallel processing type is applied in a header of each of the second data units. The parallel processing information output unit 1520 includes additional information for applying the parallel processing type in the header of the second data unit to which the parallel processing type is applied. If no parallel-processable data from among the second data units exists, the parallel processing information output unit 1520 may add only the parallel processing syntax parallel_processing_type_idc that is set to 0 to the header of the first data unit, and may skip a process of adding the parallel processing flag information to the header of the second data unit.

The parallel processing information output unit 1520 according to another embodiment may include the parallel processing syntax parallel_processing_type_idc indicating a parallel processing type that is applied to second data units having lower levels from among plurality of parallel processing types in a header of a first data unit having an upper level, and may add additional information for applying the parallel processing type indicated by the parallel processing syntax parallel_processing_type_idc to a header of each of the second data units.

A slice, a tile, and a WPP that are parallel processing types used in exemplary embodiments will now be explained in detail. A method of adding a parallel processing flag and a parallel processing syntax indicating a parallel processing type to a header of each of upper and lower data units may be applied even when a parallel processing tool other than a slice, a tile, and a WPP is used.

Figure 16:
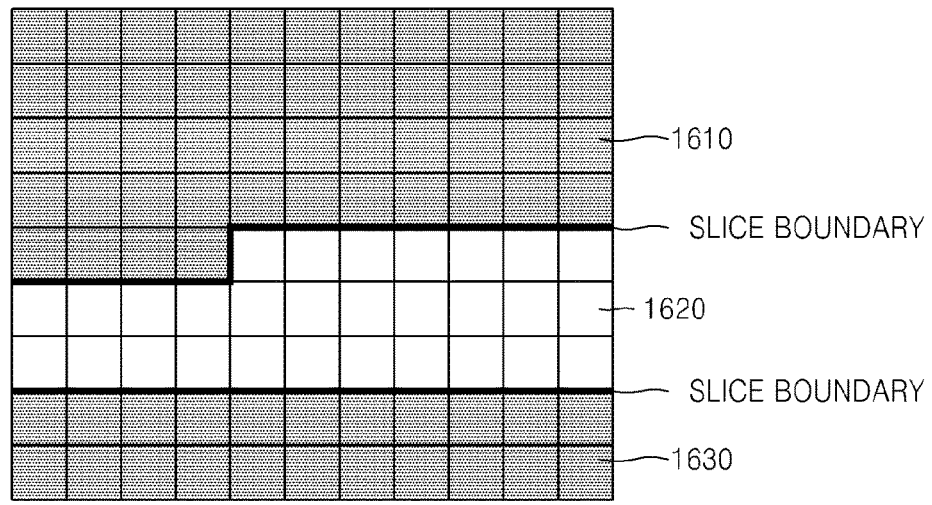
FIG. 16 is a reference diagram for explaining a slice unit according to an exemplary embodiment.

FIG. 16 is a reference diagram for explaining a slice unit according to an exemplary embodiment.

Referring to FIG. 16, one picture may be divided into slices 1610, 1620, and 1630. One slice may include at least one maximum coding unit LCU. In FIG. 16, one picture is divided into three slices 1610, 1620, and 1630 by slice boundaries. It is assumed that the slices 1610 and 1630 that are hatched in FIG. 16 are slices that may be independently processed without depending on other slices. In this case, the parallel processing information output unit 1520 adds the parallel processing syntax parallel_processing_type_idc indicating that pictures included in a sequence use a parallel-processable slice to a header, that is, a sequence parameter set (SPS), of an upper sequence including the pictures. It is assumed that when the parallel processing syntax parallel_processing_type_idc has a value of 1, it is indicated that a tile is used; when the parallel processing syntax parallel_processing_type_idc has a value of 2, it is indicated that a WPP is used; and when the parallel processing syntax parallel_processing_type_idc has a value of 3, it is indicated that a slice is used. When a parallel-processable slice is used as shown in FIG. 16, the parallel processing information output unit 1520 adds the parallel processing syntax parallel_processing_type_idc that is set to 3 to the SPS.

A flag indicating whether a corresponding slice is a parallel-processable slice may be included in a header of each of the three slices 1610, 1620, and 1630. A flag independent_slice_flag that is set to have a value of 1 for a slice that may be independently processed without depending on other slices and is set to have a value of 0 for a dependent slice may be added to a header of each slice. A flag dependent_slice_flag that is set to have a value of 0 for an independent-processable slice and is set to have a value of 1 for a dependent slice may be added to a header of each slice. For example, the parallel processing information output unit 1520 may add the flag independent_slice_flag having a value of 1 to the header of each of the hatched slices 1610 and 1630. When the flag dependent_slice_flag is used, the parallel processing information output unit 1520 may add the flag dependent_slice_flag that is set to 0 to the header of each of the hatched slices 1610 and 1630. The flag independent_slice_flag having a value of 0 or the flag dependent_slice_flag having a value of 1 may be added to the header of the slice 1620 that may not be processed in parallel.

Figure 17:
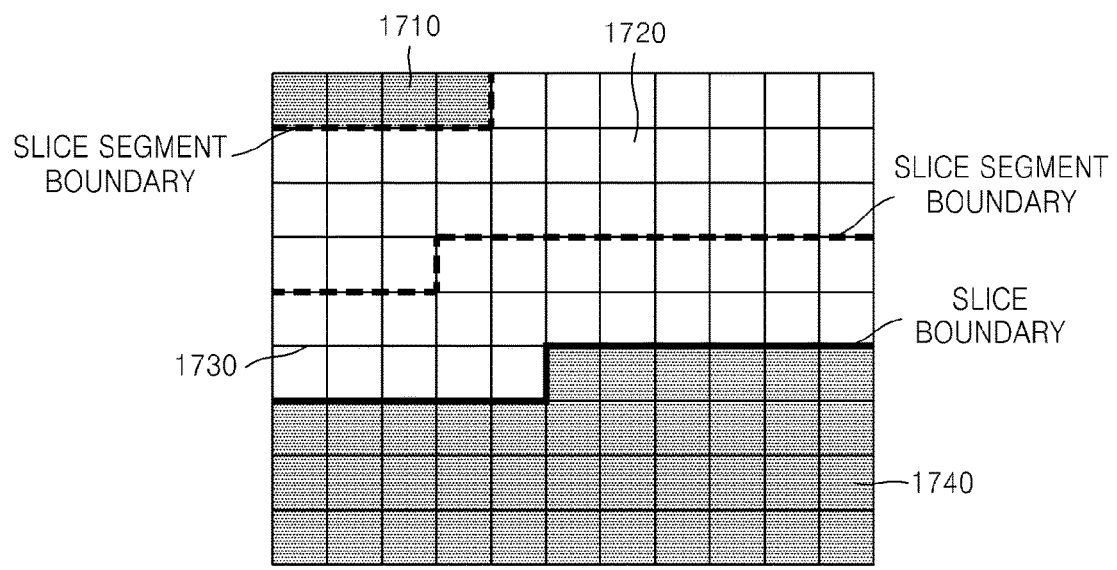
FIG. 17 is a reference diagram for explaining a slice unit according to another exemplary embodiment.

FIG. 17 is a reference diagram for explaining a slice unit according to another exemplary embodiment.

Referring to FIG. 17, it is assumed that one picture is divided into two slices by a slice boundary. It is also assumed that an upper slice is sub-divided into three slice segments 1710, 1720, and 1730 by slice segment boundaries. In addition, it is assumed that a hatched slice 1740 and a slice segment are independent-processable data units that may be independently processed without referring to other slices or other slice segments. In this case, the parallel processing information output unit 1520 adds the parallel processing syntax parallel_processing_type_idc that is set to 3 to an SPS or a picture parameter set (PPS). The parallel processing information output unit 1520 adds a parallel processing flag to a header of each slice segment. A flag independent_slice_segment_flag that is set to 1 is added to a header of each of the hatched slice 1740 and the slice segment 1710, and a flag independent_slice_segment_flag that is set to 0 is added to a header of each of the segments 1720 and 1730 that may not be processed in parallel.

Figure 18:
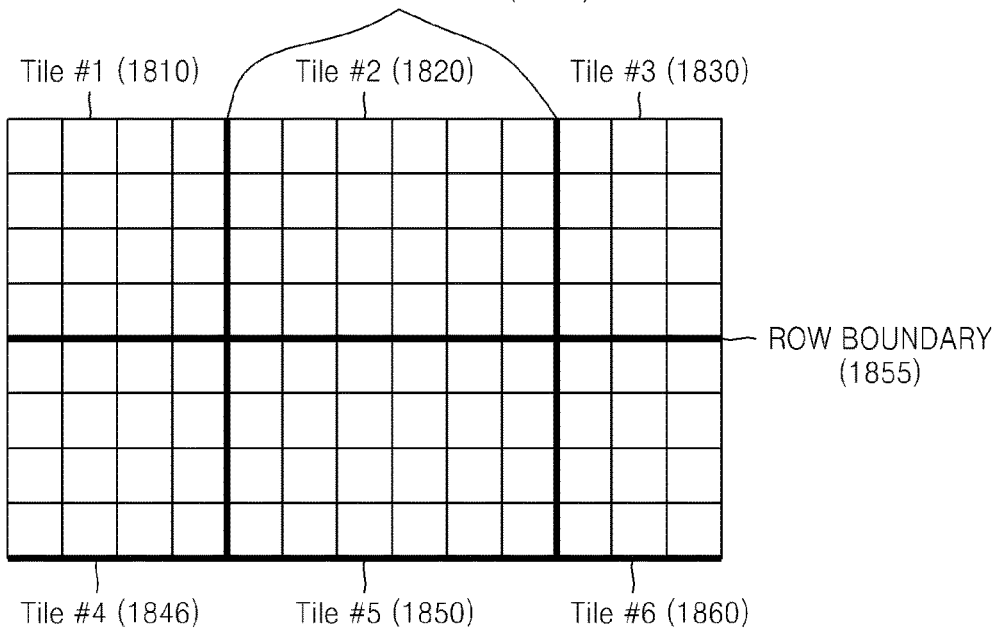
FIG. 18 is a reference diagram for explaining a tile unit according to an exemplary embodiment.

FIG. 18 is a reference diagram for explaining a tile unit according to an exemplary embodiment.

Referring to FIG. 18, one picture may be divided into a plurality of tiles 1810, 1820, 1830, 1846, 1850, and 1860. The term 'tile' refers to an independent data processing unit that is a set of maximum coding units LCUs that are separated by a column boundary 1845 and a row boundary 1855 and do not allow motion estimation or context estimation exceeding the column boundary 1845 and the row boundary 1855. That is, each tile is an independent data processing unit that does not refer to information about other tiles and may be processed in parallel.

When pictures that are included in a sequence may be processed in parallel by using a tile, the parallel processing information output unit 1520 adds the parallel processing syntax parallel_processing_type_idc having a value of 1 to an SPS. The parallel processing information output unit 1520 determines whether each of the pictures that are included in the sequence uses a tile, sets a flag tile_enabled_flag indicating whether a parallel-processable tile exists to 1 and adds the flag tile_enabled_flag to a PPS of a picture using the tile, and adds the flag tile_enabled_flag set to 0 to a PPS of a picture not using the tile. The parallel processing information output unit 1520 may add additional information about positions, etc. of the column boundary 1845 and the row boundary 1855 for determining a position of the tile to the PPS of the picture using the tile. The parallel processing information output unit 1520 may add information about a number of tiles in a column direction and a number of tiles in a row direction to the PPS of the picture using the tile, instead of the information about the positions of the column boundary and the row boundary.

Figure 19:
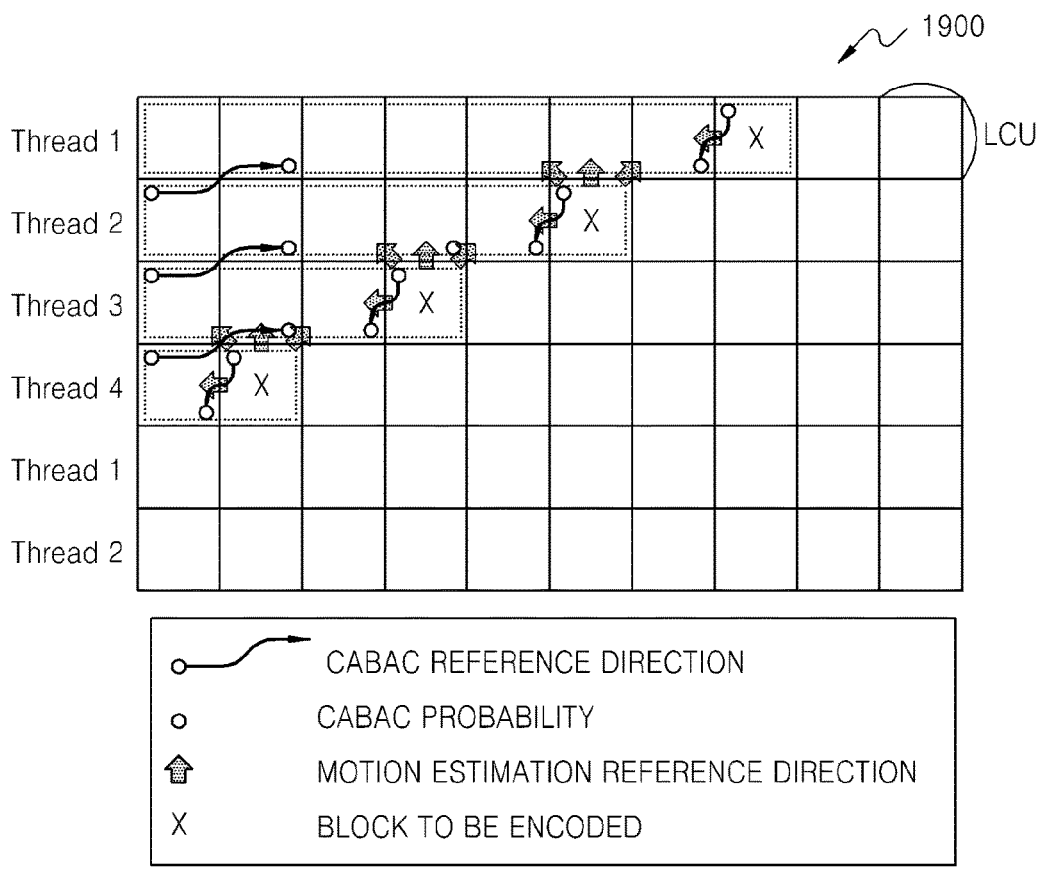
FIG. 19 is a reference diagram for explaining a wavefront parallel processing (WPP) according to an exemplary embodiment.

FIG. 19 is a reference diagram for explaining a WPP according to an exemplary embodiment.

The WPP 1900 includes a process of resetting CABAB probabilities of a first maximum coding unit LCU of each row to a probability that is obtained by processing a second maximum coding unit of an upper row for the purpose of parallel encoding/decoding. For example, referring to FIG. 19, a first maximum coding unit 1920 of a second row Thread 2 may reset a CABAB probability for entropy encoding/decoding by using a CABAB probability 1911 that is obtained by processing a second maximum coding unit 1910 of a first row Thread 1. According to the WPP, since first maximum coding units of each row are processed after second maximum coding units of an upper row are completely processed, maximum coding units of each row may obtain motion estimation information, for example, predicted motion vector information, by using maximum coding units of an upper row. Accordingly, first through fourth rows Thread 1 through Thread 4 may be processed in parallel at a point of time when a second maximum coding unit of an upper row is completely processed.

When pictures that are included in a sequence may be processed in parallel by using a WPP, the parallel processing information output unit 1520 adds the parallel processing syntax parallel_processing_type_idc having a value of 2 to an SPS. The parallel processing information output unit 1520 determines whether each of the pictures that are included in the sequence uses a WPP, sets a flag wpp_enabled_flag indicating whether parallel processing may be performed by using a WPP to 1 and adds the flag wpp_enabled_flag to a PPS of a picture using the WPP, and adds the flag wpp_enabled_flag set to 0 to a PPS of a picture not using the WPP. The parallel processing information output unit 1520 may add additional information about which upper block's entropy coding probability information is to be used in order to obtain initial entropy coding probability information of each block column. That is, the parallel processing information output unit 1520 may add additional information about which block's entropy coding probability information is to be used from among upper blocks to a PPS. If a position of an upper block that is used to obtain initial entropy coding probability information of a lower block is previously determined, such additional information may not be added and may be skipped.

Figure 20:
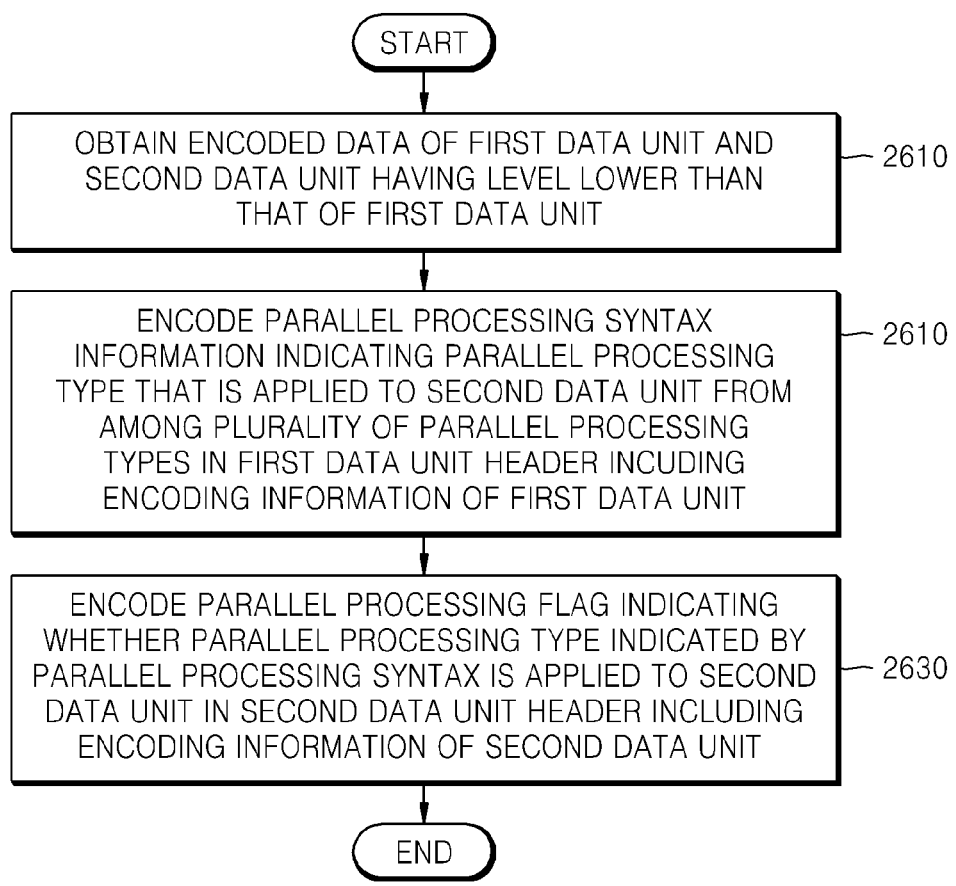
FIG. 20 is a flowchart illustrating a video encoding method for parallel processing, according to an exemplary embodiment.

FIG. 20 is a flowchart illustrating a video encoding method for parallel processing, according to an exemplary embodiment.

Referring to FIG. 20, in operation 2610, the parallel processing determiner 1510 obtains encoded data of a first data unit that constitutes a video and a second data unit having a level lower than that of the first data unit.

In operation 2620, the parallel processing information output unit 1520 encodes parallel processing syntax information indicating a parallel processing type that is applied to the second data unit from among a plurality of parallel processing types in a first data unit header including encoding information of the first data unit. As described above, assuming that when the parallel processing syntax parallel_processing_type_idc has a value of 1, it is indicated that a tile is used; when the parallel processing syntax parallel_processing_type_idc has a value 2, it is indicated that a WPP is used; and when the parallel processing syntax parallel_processing_type_idc has a value of 3, it is indicated that a slice is used, the parallel processing information output unit 1520 determines a parallel processing type that is used in a picture or a slice that is included in a sequence and adds the parallel processing syntax parallel_processing_type_idc indicating the corresponding parallel processing type to an SPS.

In operation 2630, the parallel processing information output unit 1520 encodes a parallel processing flag indicating whether the parallel processing type indicated by the parallel processing syntax is applied to the second data unit in a second data unit header including encoding information of the second data unit. As described above, when each of pictures that are included in the sequence uses a slice, the parallel processing information output unit 1520 adds the parallel processing syntax parallel_processing_type_idc that is set to 3 to an SPS, and determines whether each slice may be processed in parallel and adds the flag independent_slice_flag or dependent_slice_flag to a header of each slice. When a picture using a tile from exists from among the pictures that are included in the sequence, the parallel processing information output unit 1520 adds the parallel processing syntax parallel_processing_type_idc that is set to 1 to an SPS, and determines whether a tile is included in each picture and adds the flag tile_enabled_flag to a PPS of each picture. When a picture that may be processed in parallel by using a WPP exists in the sequence, the parallel processing information output unit 1520 adds the parallel processing syntax parallel_processing_type_idc set to 2 to an SPS, and determines whether each picture uses a WPP and adds the flag wpp_enabled_flag to a PPS of each picture.

The parallel processing information output unit 1520 according to another embodiment may include the parallel processing syntax parallel_processing_type_idc indicating a parallel processing type that is applied to second data units having lower levels from among a plurality of parallel processing types in a header of a first data unit having an upper level, and may add additional information for applying the parallel processing type indicated by the parallel processing syntax parallel_processing_type_idc to a header of each of the second data units having the lower levels. That is, according to another embodiment, assuming that the processing type indicated by the parallel processing syntax parallel_processing_type_idc is applied to all of the second data units having the lower levels, additional information for applying the parallel processing type may be included in the header of each of the second data units having the lower levels.

Figure 21:
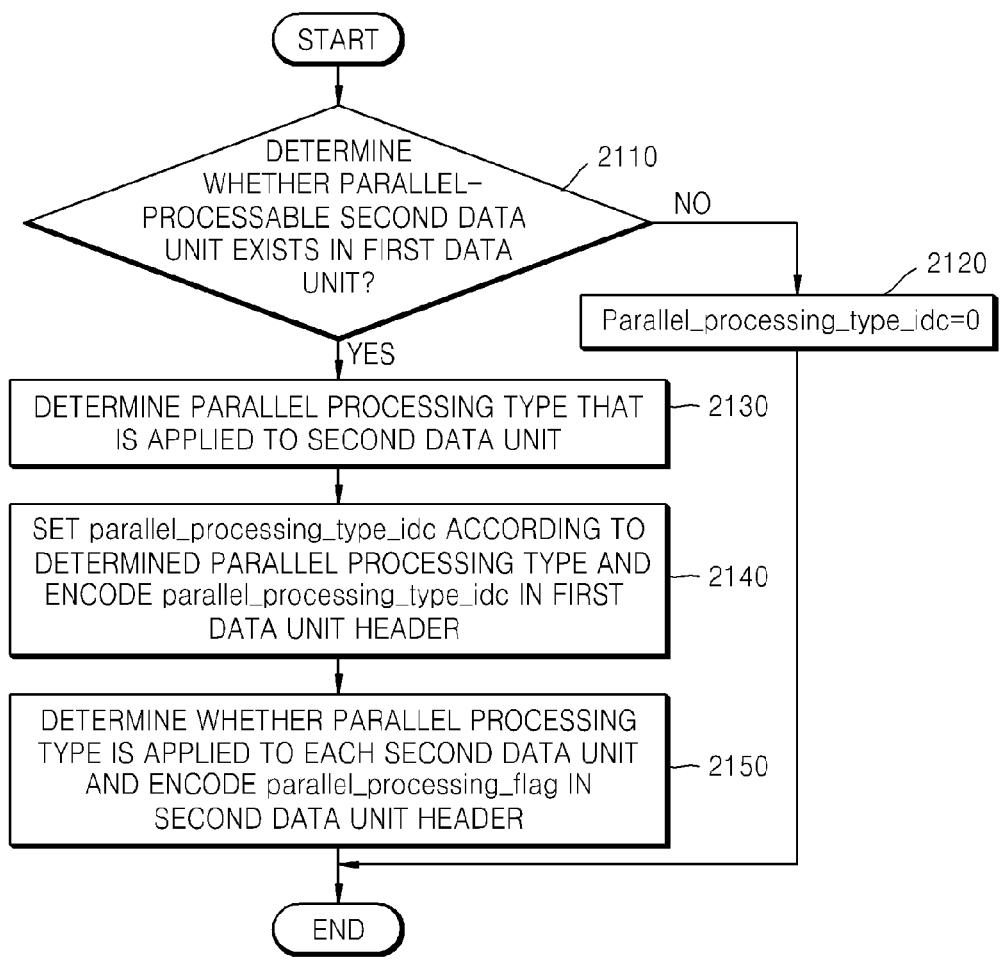
FIG. 21 is a detailed flowchart illustrating a video encoding method for parallel processing, according to an exemplary embodiment.

FIG. 21 is a detailed flowchart illustrating a video encoding method for parallel processing, according to an exemplary embodiment.

Referring to FIG. 21, in operation 2110, the parallel processing determiner 1510 determines whether a parallel-processable data unit exists in a second data unit having a level lower than that of a first data unit.

In operation 2120, when no parallel-processable second data unit exists, the parallel processing information output unit 1520 adds the parallel processing syntax parallel_processing_type_idc that is set to 0 to a header of the first data unit.

In operation 2130, when a parallel-processable second data unit exists, the parallel processing determiner 1510 determines a parallel processing type that is applied to the second data unit.

In operation 2140, the parallel processing information output unit 1520 sets a value of the parallel processing syntax parallel_processing_type_idc according to the determined parallel processing type, and encodes the set parallel processing syntax parallel_processing_type_idc in the header of the first data unit.

In operation 2150, the parallel processing information output unit 1530 determines whether the parallel processing type indicated by the parallel processing syntax parallel_processing_type_idc is applied to each second data unit, and encodes the flag parallel_processing_flag indicating whether the parallel processing type is applied in a header of the second data unit. As described above, when a slice is used, the flag parallel_processing_flag indicates the flag independent_slice_flag or dependent_slice_flag. When a tile is used, the flag parallel_processing flag indicates the flag parallel_processing_flag or tile_enabled_flag. When a WPP is used, the flag parallel_processing_flag indicates the flag wpp_enabled_flag.

FIG. 22 is a diagram illustrating an SPS according to an exemplary embodiment.

Referring to FIG. 22, a parallel processing syntax parallel_processing_type_idc 2210 that indicates a parallel processing type that is applied to a data unit having a lower level in a sequence may be included in an SPS.

FIG. 23 is a table showing a parallel processing syntax according to a parallel processing type, according to an exemplary embodiment.

Referring to FIG. 23, when n usable parallel processing types exist, the parallel processing syntax parallel_processing_type_idc may have a value ranging from 0 to n. When the parallel processing syntax parallel_processing_type_idc has a value of 0, it is indicated that no parallel processing type may be applied to a data unit having a lower level. The parallel processing syntax parallel_processing_type_idc having a value ranging from 1 to n indicates that one parallel processing type from among the n different parallel processing types may be used for a second data unit. Assuming that a tile, a WPP, and a slice are usable parallel processing types, it may be set that when the parallel processing syntax parallel_processing_type_idc has a value of 1, a tile is used; when the parallel processing syntax parallel_processing_type_idc has a value of 2, a WPP is used; and when the parallel processing syntax parallel_processing_type_idc has a value of 3, a slice is used. Which parallel processing type is indicated is not limited thereto and may vary according to a number of parallel processing types and a value of the parallel processing syntax parallel_processing_type_idc.

FIG. 24 is a diagram illustrating a PPS according to an exemplary embodiment.

Referring to FIG. 24, when a tile is used as a parallel processing type, the parallel processing syntax parallel_processing_type_idc having a value of 1 is added to an SPS, and a flag tiles_enabled_flag 2410 that indicates whether a tile is included in a corresponding picture is included in a PPS of each picture. When the flag tiles_enabled_flag 2410 has a value of 1, it is indicated that the tile is included in the corresponding picture, and when the flag tiles_enabled_flag 2410 has a value of 0, it is indicated that the tile does not exist in the corresponding picture. Although not shown in FIG. 24, additional information about, for example, positions of a column boundary and a row boundary, for determining a position of the tile may be included in the PPS of the picture using the tile. Instead of the information about the positions of the column boundary and the row boundary, information about a number of tiles in a column direction and a number of tiles in a row direction may be included in the PPS of the picture using the tile.

FIG. 25 is a diagram illustrating a PPS according to another exemplary embodiment.

Referring to FIG. 25, when a WPP is used as a parallel processing type, the parallel processing syntax parallel_processing_type_idc having a value of 2 is added to an SPS, and a flag wpp_enabled_flag 2510 that indicates whether a WPP is applied to a corresponding picture is included in a PPS of each picture. When the flag wpp_enabled_flag 2510 has a value of 1, it is indicated that the corresponding picture may be processed in parallel by using the wpp, and when the flag wpp_enabled_flag 2510 has a value of 0, it is indicated that the corresponding picture may not be processed in parallel by using the wpp. In order to obtain initial entropy coding probability information of each block column, additional information about which upper block's entropy coding probability information is to be used may be included in the PPS of the picture using the WPP.

FIG. 26 is a diagram illustrating a slice header according to an exemplary embodiment.

Referring to FIG. 26, when a slice is used as a parallel processing type, the parallel processing syntax parallel_processing_type_idc having a value of 3 is added to an SPS, and a flag independent_slice_flag (or dependent_slice_flag) 2650 that indicates whether each slice header may be independently processed independent. When the flag independent_slice_flag has a value of 1, it is indicated that the corresponding slice may be processed in parallel, and when the flag independent_slice_flag has a value of 0, it is indicated that the corresponding slice may not be processed in parallel.

Figure 27:
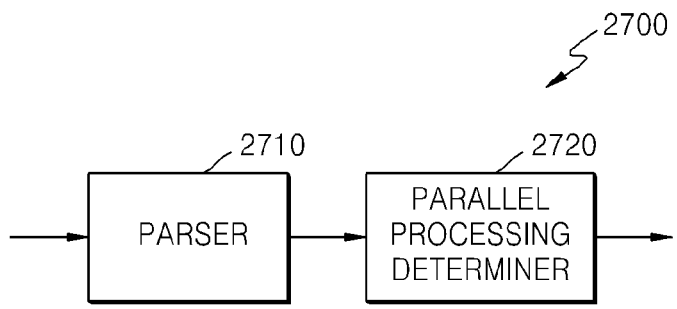
FIG. 27 is a block diagram illustrating an entropy decoding apparatus according to an exemplary embodiment.
Figure 28:
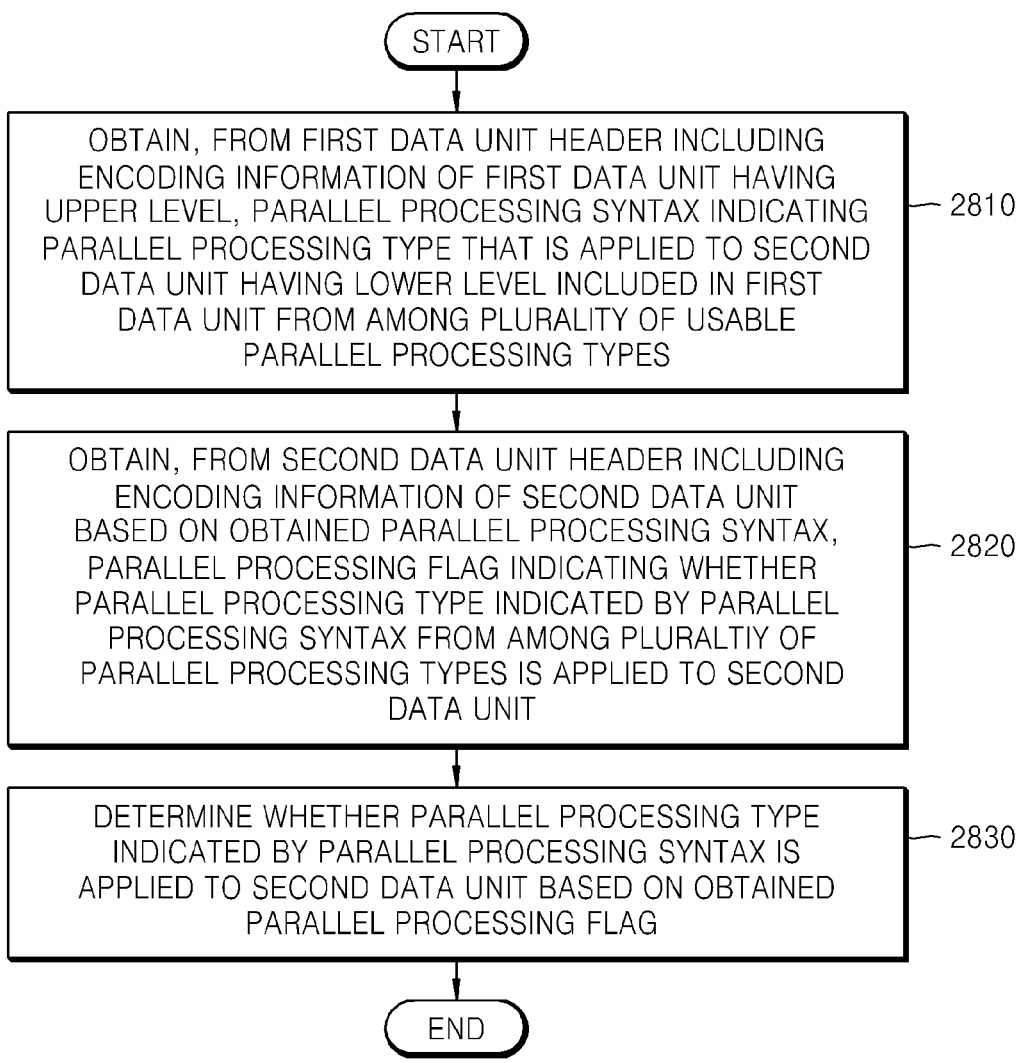
FIG. 28 is a flowchart illustrating a video decoding method according to an exemplary embodiment.

FIG. 27 is a block diagram illustrating an entropy decoding apparatus 2700 according to an exemplary embodiment. FIG. 28 is a flowchart illustrating a video decoding method according to an exemplary embodiment. The entropy decoding apparatus 2700 of FIG. 27 corresponds to the entropy decoder 520 of FIG. 5.

Referring to FIGS. 27 and 28, in operation 2810, a parser 2710 obtains, from a first data unit header including encoding information of a first data unit having an upper level that constitutes a video and is included in a bitstream, a parallel processing syntax indicating a parallel processing type that is applied to a second data unit having a lower level that is included in the first data unit from among a plurality of usable parallel processing types. As described above, the parser 2710 may obtain the parallel processing syntax parallel_processing_type_idc from an SPS.

In operation 2820, a parallel processing determiner 2720 obtains, from a second data unit header including encoding information of the second data unit based on the obtained parallel processing syntax parallel_processing_type_idc, a parallel processing flag indicating whether the parallel processing type indicated by the parallel processing syntax is applied to the second data unit. As described above, when the parallel processing syntax parallel_processing_type_idc has a value of 0, the parallel processing determiner 2720 does not obtain a separate parallel processing flag from a lower data unit such as a picture or a slice that is included in a sequence and skips a process of parsing the parallel processing flag.

In operation 2830, the parallel processing determiner 2720 determines whether the parallel processing type indicated by the parallel processing syntax that is obtained for each second data unit is applied based on the obtained parallel processing flag. As described above, when the parallel processing syntax parallel_processing_type_idc has a value of 1 and a picture using a tile exists in the sequence, the parallel processing determiner 2720 obtains the flag tiles_enabled_flag from a PPS of each picture and determines whether each picture may be processed in parallel by using a tile based on the obtained flag tiles_enabled_flag. When the parallel processing syntax parallel_processing_type_idc has a value 2 and a picture using a wpp exists in the sequence, the parallel processing determiner 2720 obtains the flag wpp_enabled_flag from the PPS of each picture and determines whether each picture may be processed in parallel by using a wpp. When the parallel processing syntax parallel_processing_type_idc has a value of 3 and a picture using a slice exists in the sequence, the parallel processing determiner 2720 obtains the flag independent_slice_flag from a header of each slice, obtains the flag wpp_enabled_flag, and determines whether each slice may be processed in parallel based on the obtained flag independent_slice_flag. When it is determined that the parallel processing type indicated by the parallel processing syntax is applied to the second data unit, the parallel processing determiner 2720 may additionally read additional information for applying the parallel processing type from a header of the second data unit. For example, when the parallel processing syntax parallel_processing_type_idc that is obtained from the SPS has a value of 1 and a tile may be applied to a picture, the parallel processing determiner 2720 may read additional information about, for example, positions of a column boundary and a row boundary for determining a position of the tile or information about a number of tiles in a column direction and a number of tiles in a row direction from the PPS of the picture to which the tile is applied. When the parallel processing syntax parallel_processing_type_idc that is obtained from the SPS has a value of 2 and a WPP may be applied to a picture, the parallel processing determiner 2720 may read additional information about whether which upper block's entropy coding probability information is to be used in order to obtain initial entropy coding probability information of each block column from the PPS of the picture to which the WPP is applied.

According to another embodiment, the parallel processing determiner 2720 may obtain the parallel processing syntax parallel_processing_type_idc indicating a parallel processing type that is applied to second data units having lower levels from a header of a first data unit having an upper level to determine the parallel processing type that is applied to each of the second data units having the lower levels, may determine that the parallel processing type indicated by the parallel processing syntax parallel_processing_type_idc is applied to all of the second data units having the lower levels, and may read additional information for applying the parallel processing type, instead of reading a flag determining whether the parallel processing type is individually applied from a header of each of the second data units.

FIG. 29 is a detailed flowchart illustrating a video decoding method according to an exemplary embodiment.

Referring to FIG. 29, in operation 2910, the parallel processing determiner 2720 obtains the parallel processing syntax parallel_processing_type_idc indicating a parallel processing type that is applied to a lower data unit from an SPS.

In operation 2920, when the parallel processing syntax parallel_processing_type_idc has a value of 0, the parallel processing determiner 2720 determines that parallel-processable data does not exist in a current sequence. In operation 2930, when the parallel processing syntax parallel_processing_type_idc has a value of 1 and a picture using a tile exists in the sequence, the parallel processing determiner 2720 obtains the flag tiles_enabled_flag from a PPS of each picture. In operation 2940, when the parallel processing syntax parallel_processing_type_idc has a value of 2 and a picture using a wpp exists in the sequence, the parallel processing determiner 2720 obtains the flag wpp_enabled_flag from the PPS of each picture. In operation 2950, when the parallel processing syntax parallel_processing_type_idc has a value of 3 and a picture using a slice exists in the sequence, the parallel processing determiner 2720 obtains the flag independent_slice_flag from a header of each slice.

Except that the parallel processing syntax parallel_processing_type_idc has a value of 0, when a flag indicating whether a parallel processing type is applied to the lower data unit is obtained from a PPS or a slice header, the parallel processing determiner 2720 determines whether the parallel processing type is applied to each lower data unit based on the obtained flag. When it is determined that the parallel processing type indicated by the parallel processing syntax is applied to a second data unit, the parallel processing determiner 2720 may additionally read additional information for applying the parallel processing type from a header of the second data unit (operation S2960).

As described above, according to another exemplary embodiment, the parallel processing determiner 2720 may obtain the parallel processing syntax parallel_processing_type_idc indicating a parallel processing type that is applied to second data units having lower levels from a header of a first data unit having an upper level to determine the parallel processing type that is applied to each of the second data units having the lower levels, may determine that the parallel processing type indicated by the parallel processing syntax parallel_processing_type_idc is applied to all of the second data units having the lower levels, and may read additional information for applying the parallel processing type, instead of reading a flag determining whether the parallel processing type is individually applied from a header of each of the second data units.

Exemplary embodiments may be embodied in a general purpose digital computer by running a program from a computer-readable recording medium. Examples of the computer-readable recording medium include storage media such as magnetic storage media (e.g., read only memories (ROMs), floppy discs, or hard discs), optically readable media (e.g., compact disk-read only memories (CD-ROMs), or digital versatile disks (DVDs)), etc.

While exemplary embodiments have been particularly shown and described with reference to the drawings, it will be understood by those of ordinary skill in the art that various changes in form and details may be made therein without departing from the spirit and scope of the inventive concept as defined by the appended claims. The exemplary embodiments should be considered in descriptive sense only and not for purposes of limitation. Therefore, the inventive concept is defined not by the detailed description of the exemplary embodiments but by the appended claims, and all differences within the scope will be construed as being included in the inventive concept.

The invention claimed is:

1. A video decoding method comprising:
obtaining, from a first data unit header including encoding information of a first data unit of an upper level that constitutes a video and is included in a bitstream, a parallel processing syntax indicating a parallel processing type that is applied to a second data unit of a lower level included in the first data unit from among a plurality of parallel processing types;
obtaining, from a second data unit header including encoding information of the second data unit based on the parallel processing syntax, a parallel processing flag indicating whether the parallel processing type indicated by the parallel processing syntax from among the plurality of parallel processing types is applied to the second data unit; and
determining whether the parallel processing type indicated by the parallel processing syntax is applied to the second data unit based on the obtained parallel processing flag,
when the parallel processing type is applied, decoding the second data unit by parallel processing according to the parallel processing type,
wherein the first data unit is a sequence, the second data unit is a slice, the first data unit header is an SPS, and the second data unit header is a slice header,
wherein the parallel processing syntax that is included in the SPS indicates the parallel processing type that is applied to at least one slice that is included in the slice from among n (n is an integer) preset parallel processing types,
wherein the parallel processing flag that is included in the slice header indicates whether the parallel processing type indicated by the parallel processing syntax is applied to the slice, and
wherein when the parallel processing type indicated by the parallel processing syntax is applied to the slice, the video decoding method further comprises reading additional information for applying the parallel processing type from the slice header,
wherein the obtaining of the parallel processing flag skips a parsing process of obtaining the parallel processing flag indicating the parallel processing type other than the parallel processing type indicated by the parallel processing syntax from among the plurality of parallel processing types.

2. A video decoding apparatus comprising:
a processor; and
a memory storing a program which causes the processor to:
obtain, from a first data unit header including encoding information of a first data unit of an upper level that constitutes a video and is included in a bitstream, a parallel processing syntax indicating a parallel processing type that is applied to a second data unit of a lower level that is included in the first data unit from among a plurality of parallel processing types, and to obtain, from a second data unit header including encoding information of the second data unit based on the parallel processing syntax, a parallel processing flag indicating whether the parallel processing type indicated by the parallel processing syntax from among the plurality of parallel processing types is applied to the second data unit, and
determine whether the parallel processing type indicated by the parallel processing syntax is applied to the second data unit based on the obtained parallel processing flag,
wherein the first data unit is a sequence, the second data unit is a slice, the first data unit header is an SPS, and the second data unit header is a slice header,
wherein the parallel processing syntax that is included in the SPS indicates the parallel processing type that is applied to at least one slice included in the sequence from among n (n is an integer) preset parallel processing types,
wherein the parallel processing flag that is included in the slice header indicates whether the parallel processing type indicated by the parallel processing syntax is applied to the slice, and
wherein when the parallel processing type indicated by the parallel processing syntax is applied to the slice, the parallel processing determiner reads additional information for applying the parallel processing type from the slice header,
wherein the processor skips a parsing process of obtaining the parallel processing flag indicating the parallel processing type other than the parallel processing type indicated by the parallel processing syntax from among the plurality of parallel processing types.

3. A video decoding method comprising:
obtaining, from a header of a first data unit of an upper level, a parallel processing syntax indicating a parallel processing type applied to a second data unit of a lower level;
obtaining, from a header of a second data unit, a parallel processing flag indicating whether the parallel processing type is applied to the second data unit; and
determining whether the parallel processing type is applied to the second data unit based on the parallel processing flag,
when the parallel processing type is applied, decoding the second data unit by parallel processing according to the parallel processing type,
wherein the first data unit is a sequence, the second data unit is a slice, the first data unit header is an SPS, and the second data unit header is a slice header,
wherein the parallel processing syntax that is included in the SPS indicates the parallel processing type that is applied to at least one slice that is included in the slice from among n (n is an integer) preset parallel processing types,
wherein the parallel processing flag that is included in the slice header indicates whether the parallel processing type indicated by the parallel processing syntax is applied to the slice, and
wherein when the parallel processing type indicated by the parallel processing syntax is applied to the slice, the video decoding method further comprises reading additional information for applying the parallel processing type from the slice header, wherein the obtaining of the parallel processing flag skips a parsing process of obtaining the parallel processing flag indicating the parallel processing type other than the parallel processing type indicated by the parallel processing syntax from among the plurality of parallel processing types.

* * * * *